(12) United States Patent
Davi

(10) Patent No.: US 11,135,639 B2
(45) Date of Patent: Oct. 5, 2021

(54) DEVICE AND METHOD FOR GUIDING AND DIRECTING A METAL SHEET IN A BENDING MACHINE TO OBTAIN FRUSTOCONICAL STRUCTURES

(71) Applicant: PROMAU S.R.L., Cesena (IT)

(72) Inventor: Orazio Maria Davi, Cesena (IT)

(73) Assignee: Promau S.r.l.

( * ) Notice: Subject to any disclaimer, the term of this patent is extended or adjusted under 35 U.S.C. 154(b) by 113 days.

(21) Appl. No.: 16/621,963

(22) PCT Filed: Jun. 15, 2018

(86) PCT No.: PCT/IB2018/054412
§ 371 (c)(1),
(2) Date: Dec. 12, 2019

(87) PCT Pub. No.: WO2018/229719
PCT Pub. Date: Dec. 20, 2018

(65) Prior Publication Data
US 2020/0130043 A1 Apr. 30, 2020

(30) Foreign Application Priority Data
Jun. 16, 2017 (IT) .......................... 102017000067523

(51) Int. Cl.
*B21D 43/02* (2006.01)
*B21D 5/14* (2006.01)

(52) U.S. Cl.
CPC ............. *B21D 43/023* (2013.01); *B21D 5/14* (2013.01)

(58) Field of Classification Search
CPC .......... B21D 5/14; B21D 11/06; B21D 11/08; B21D 43/00; B21D 43/021; B21D 43/023;
(Continued)

(56) References Cited

U.S. PATENT DOCUMENTS 2,723,886 A * 11/1955 Warshaw ............ F16C 29/0619
384/44
2,808,096 A * 10/1957 Erkes .................... B21C 37/185
72/133
(Continued)

FOREIGN PATENT DOCUMENTS

CN 103624166 A 3/2014
DE 1269084 B * 5/1968 ............... B21D 5/14
(Continued)

OTHER PUBLICATIONS

Boldrini, Translation of DE-1269084 (Year: 1968).*

*Primary Examiner* — Adam J Eiseman
*Assistant Examiner* — Bobby Yeonjin Kim
(74) *Attorney, Agent, or Firm* — Laubscher & Laubscher P.C.

(57) ABSTRACT

A device for guiding and directing a metal sheet in a bending machine to form continuously a conical structure, in particular a frustoconical structure, comprises:
resting and contrasting arrangement extending along a closed path, and suitable for restingly receiving a longitudinal edge of the metal sheet and contrasting a movement of the edge in a direction that is transverse to a preset advancement trajectory of the metal sheet; a supporting body for the resting and contrasting arrangement, having at least one oblong lateral portion that is suitable for facing the edge and configured for conforming the resting and contrasting arrangement to the longitudinal profile of the edge so as to obtain an extended zone of contact with said edge and impose resting and contrasting pressure distributed along the edge; the resting and contrasting arrangement is movable around the supporting body along the closed path to accompany the edge of the metal sheet by a distributed contact devoid of relative sliding and rolling, so as (Continued)

to impose on the metal sheet the advancement along the desired advancement trajectory to and through the bending machine. The corresponding method is also provided.

27 Claims, 17 Drawing Sheets

(58) Field of Classification Search
CPC ......... B21B 37/68; B21B 39/14; B21B 39/16; B21C 47/3416
USPC .................................................. 72/127, 133
See application file for complete search history.

(56) References Cited

U.S. PATENT DOCUMENTS 2,857,158 A * 10/1958 Ungerer .............. B21C 47/3416
226/172
3,398,871 A * 8/1968 Ungerer ............... B21D 43/023
226/173

FOREIGN PATENT DOCUMENTS

| DE | 1269084 B | 5/1968 |
| GB | 1203924 | 9/1970 |
| JP | H1076319 A | 3/1998 |

* cited by examiner

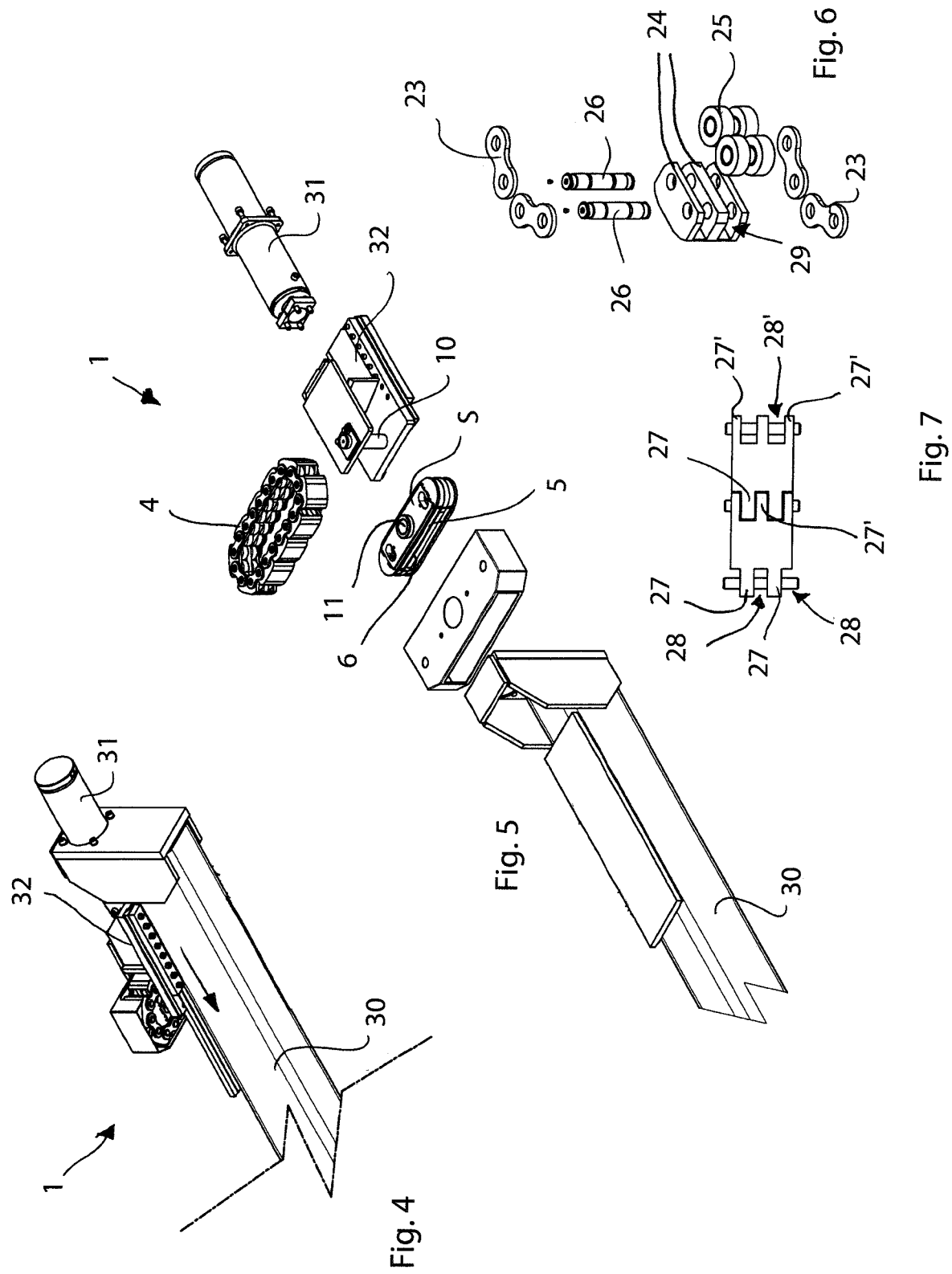

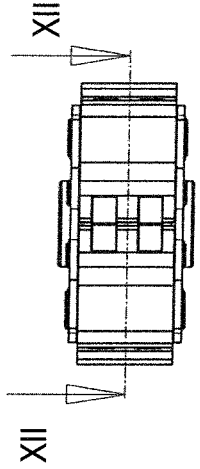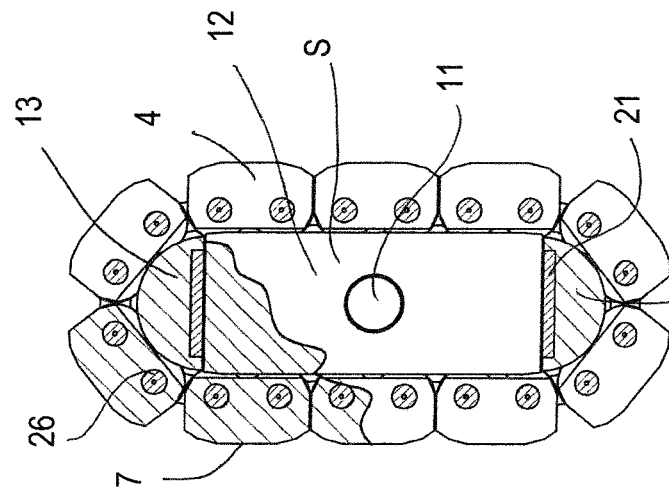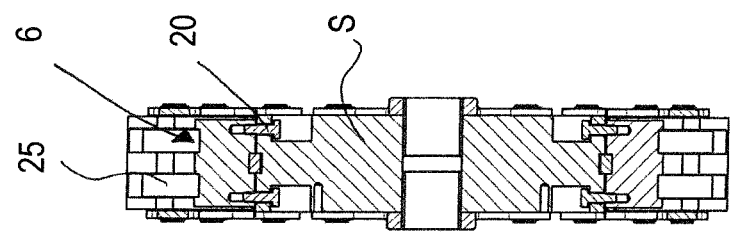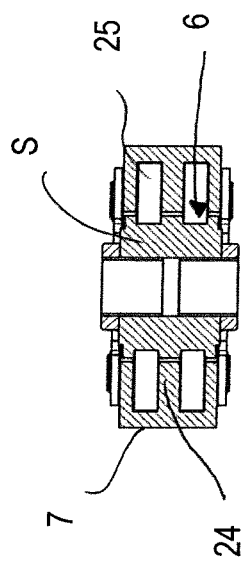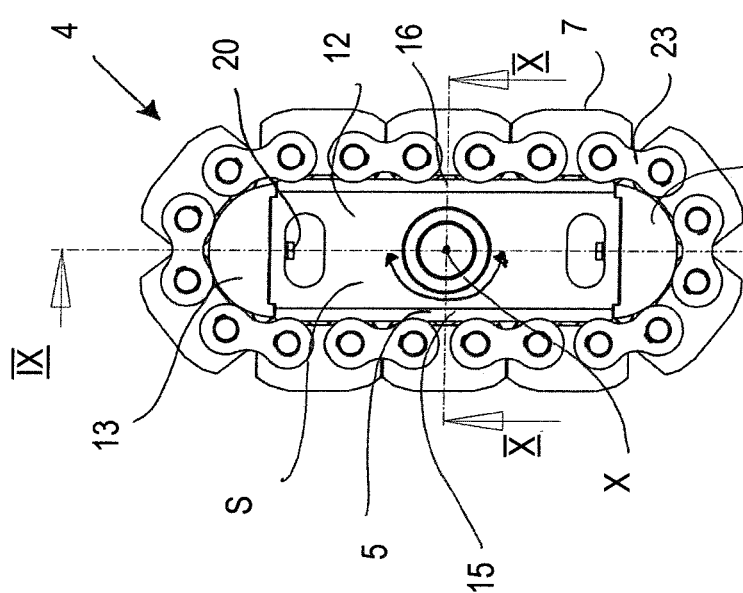

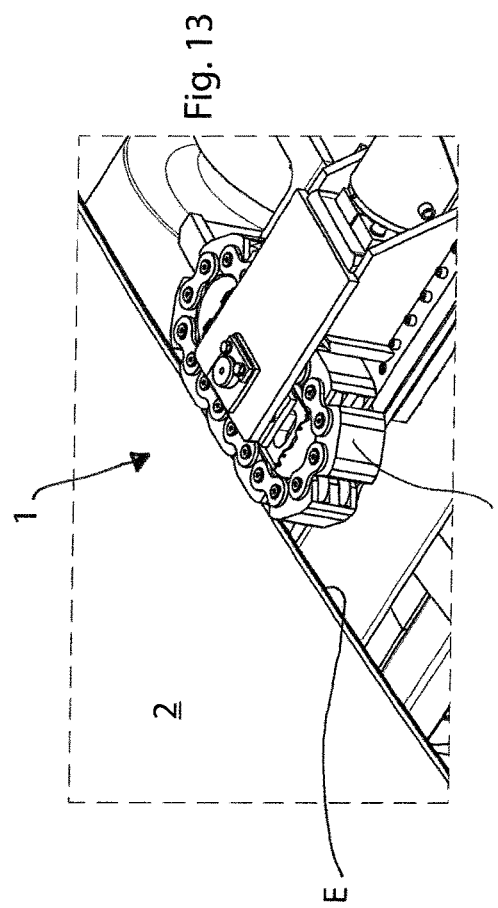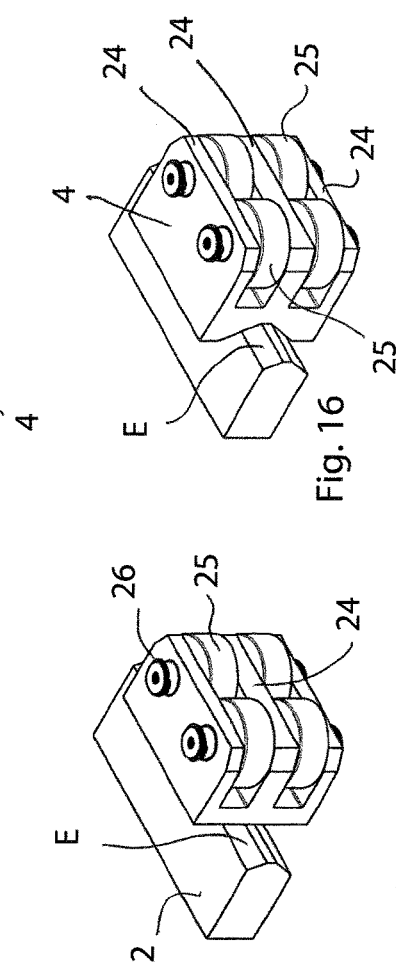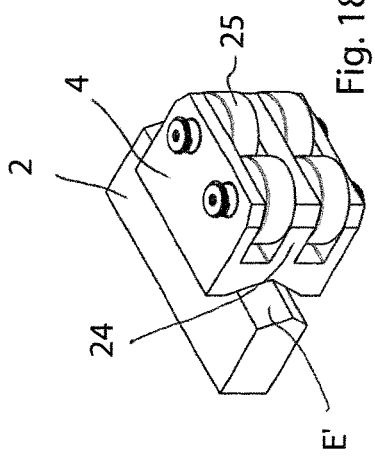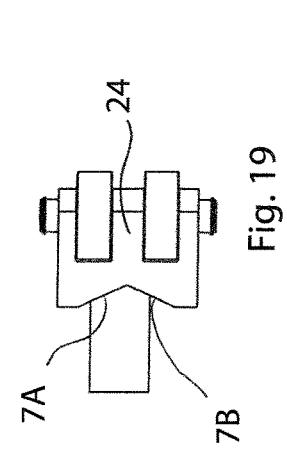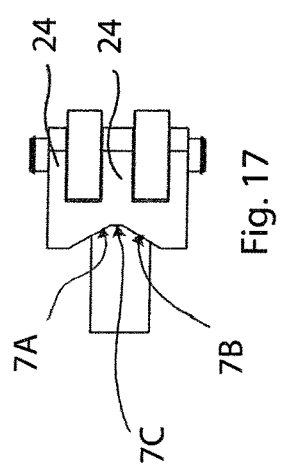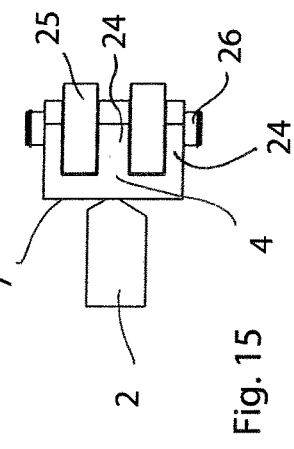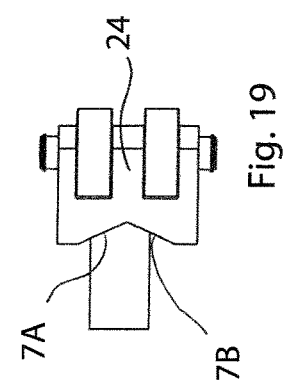

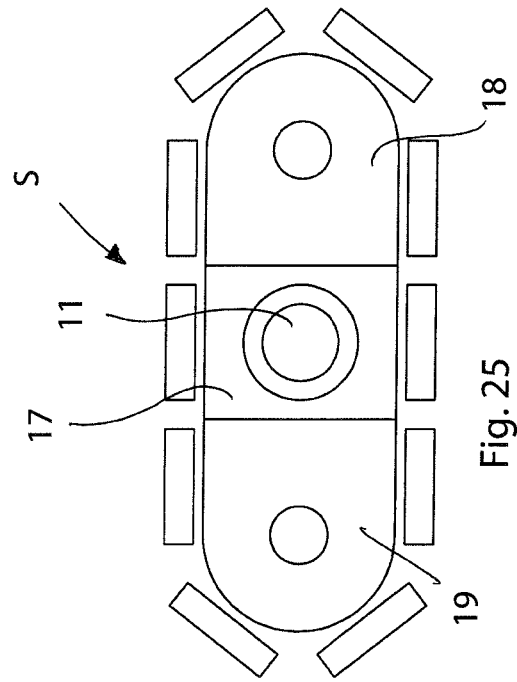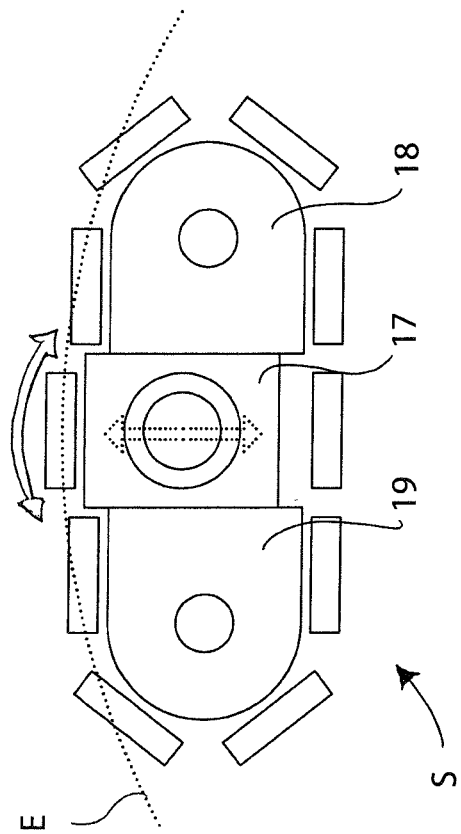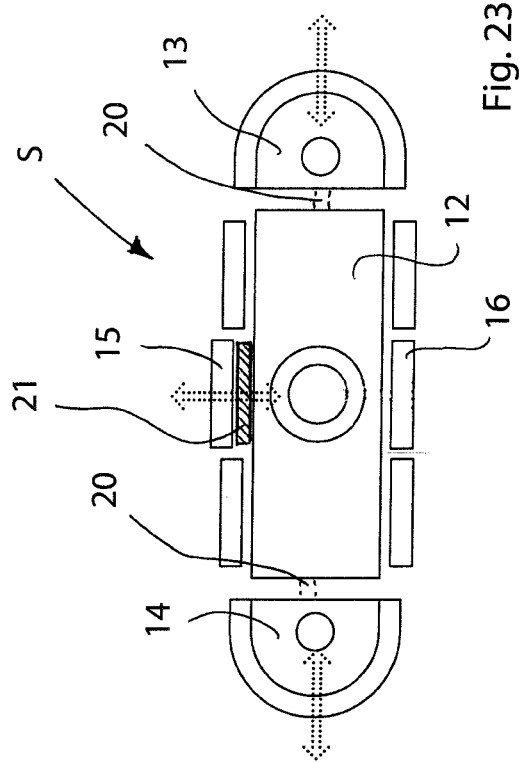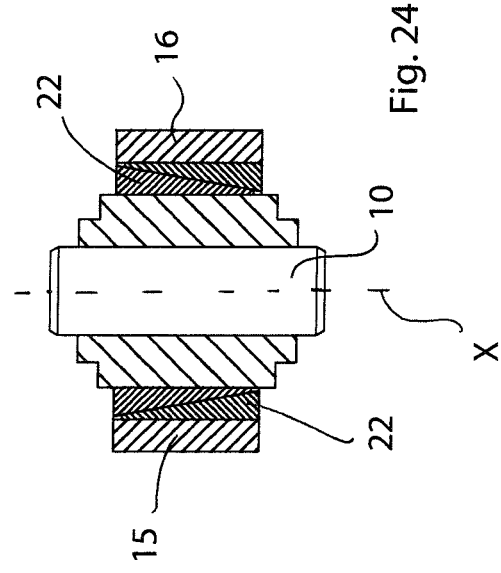

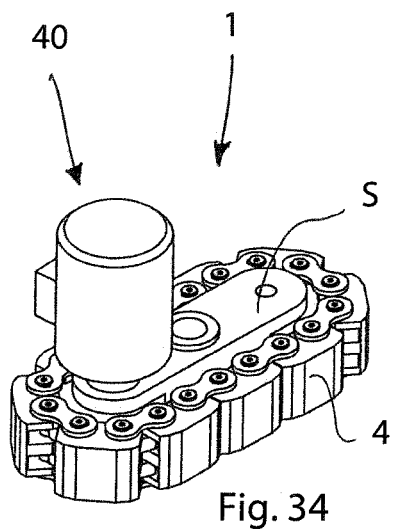
Fig. 34
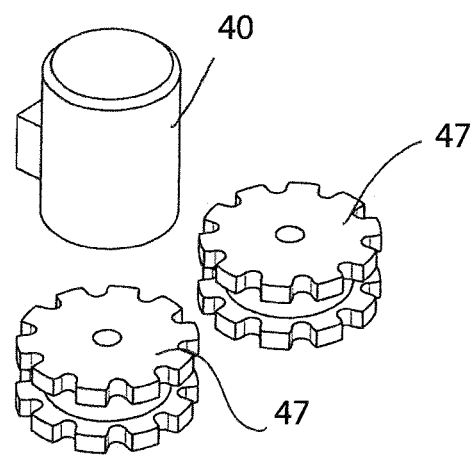
Fig. 36
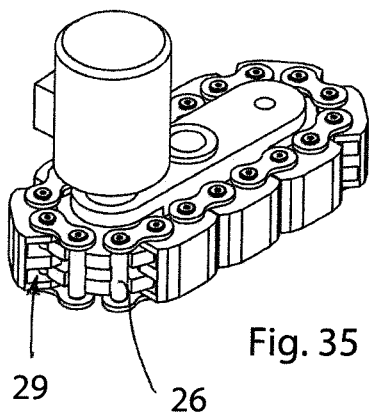
Fig. 35
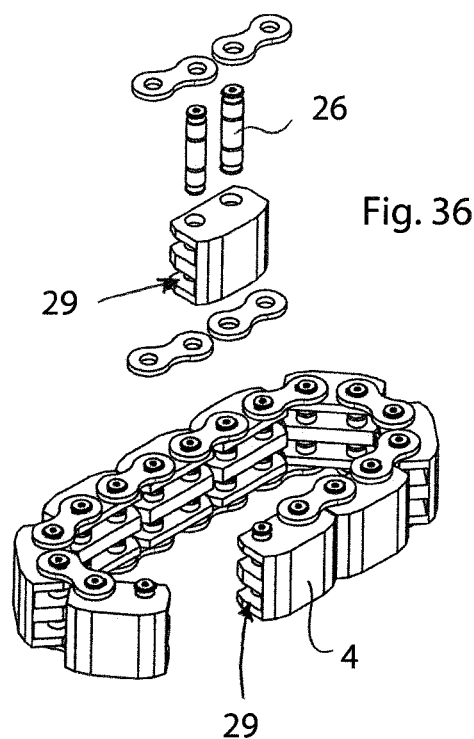

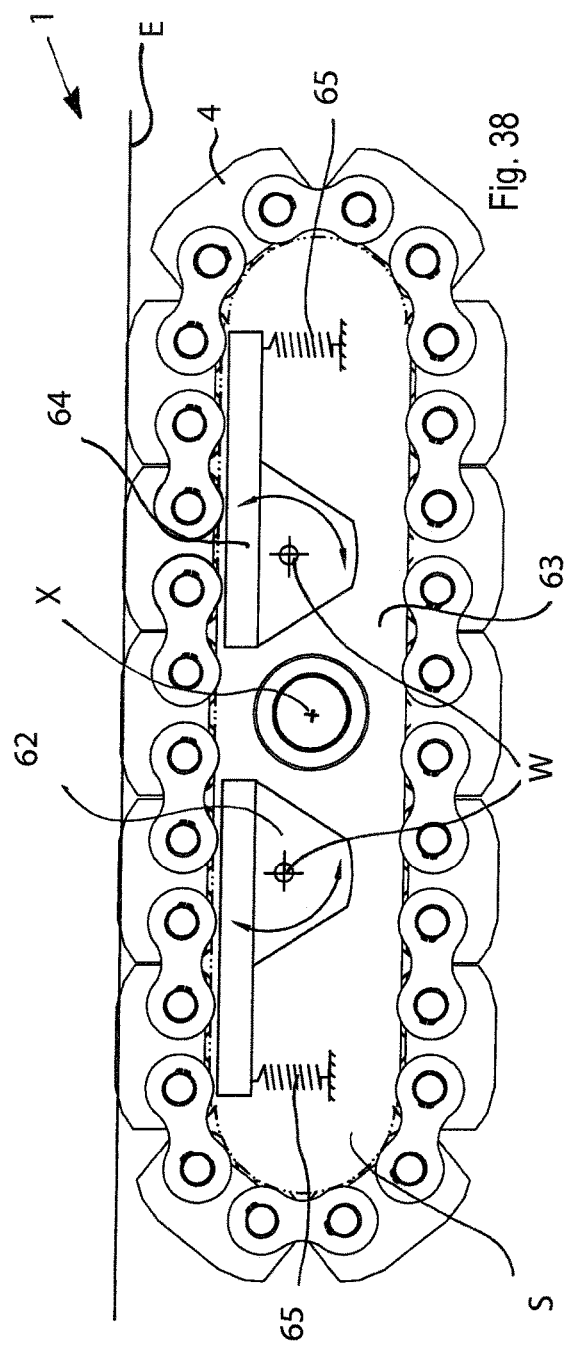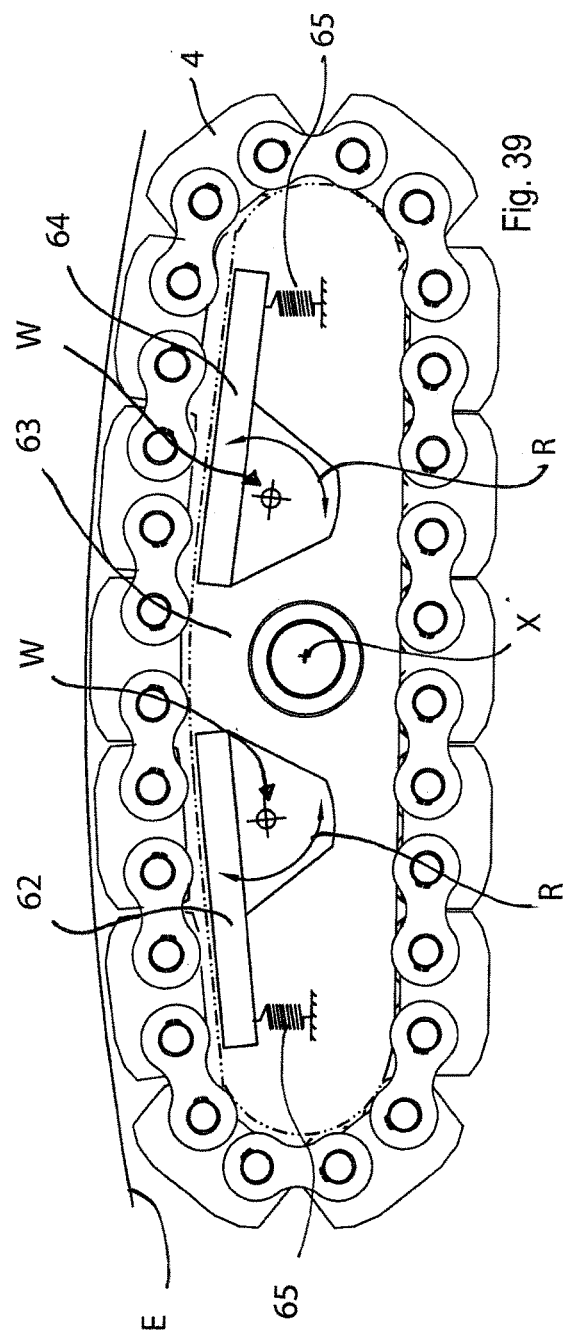

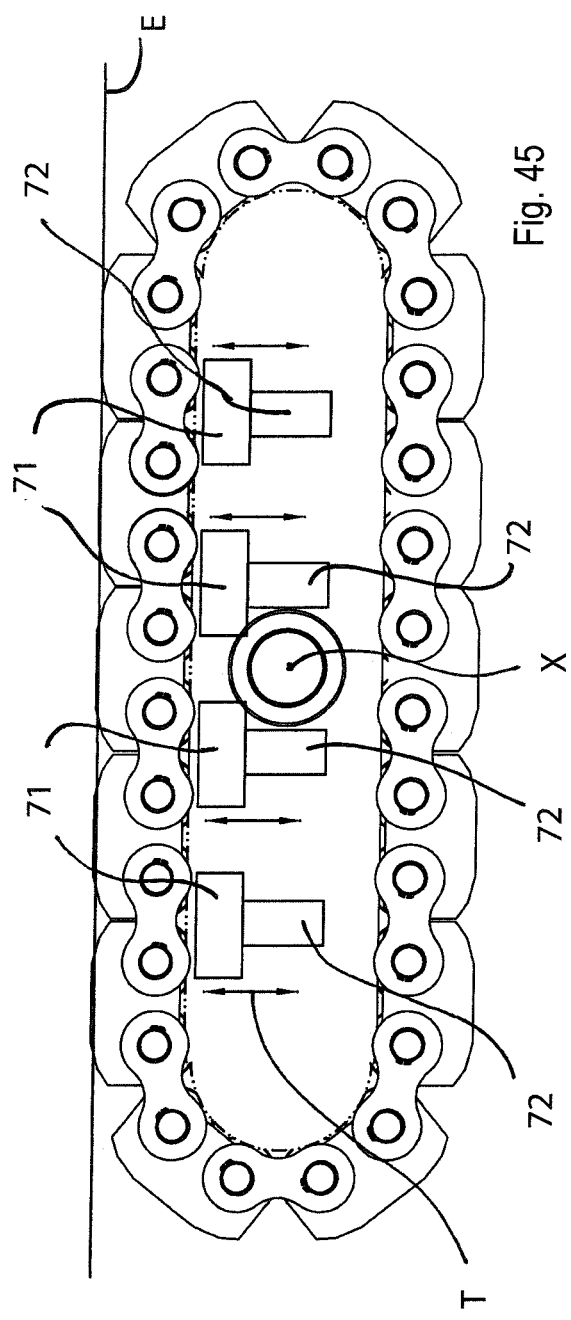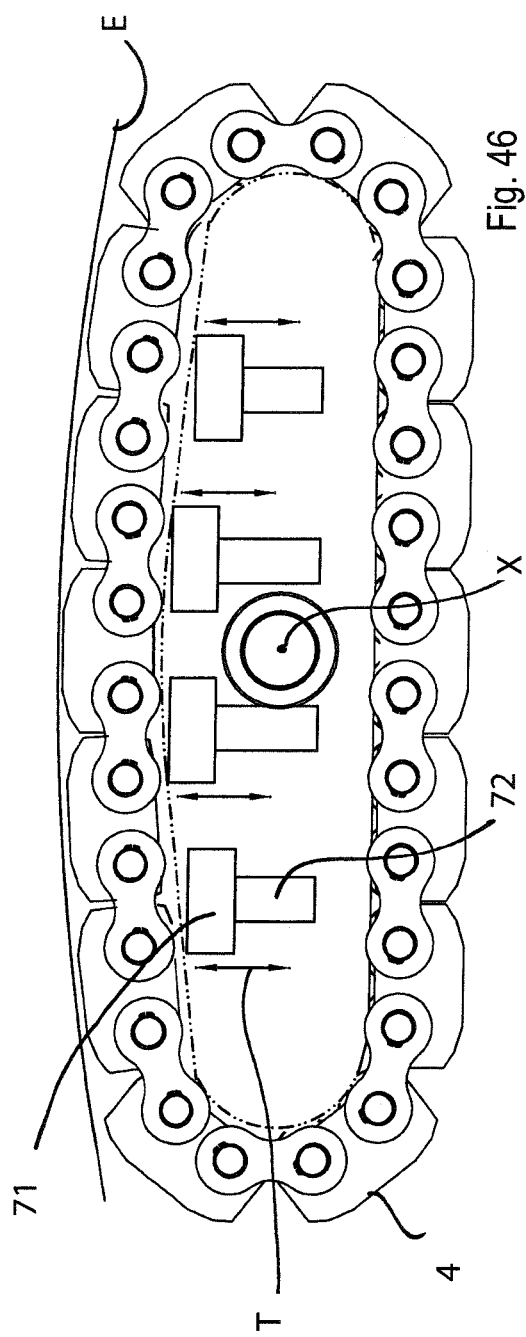

DEVICE AND METHOD FOR GUIDING AND DIRECTING A METAL SHEET IN A BENDING MACHINE TO OBTAIN FRUSTOCONICAL STRUCTURES

CROSS-REFERENCE TO RELATED APPLICATIONS

This application is a § 371 National Stage Entry of PCT International Application No. PCT/IB2018/054412 filed Jun. 15, 2018. Application No. PCT/IB2018/054412 claims priority of IT Application No. 102017000067523 filed Jun. 16, 2017. The entire content of these applications is incorporated herein by reference.

BACKGROUND OF THE INVENTION

The present invention relates to the sector of rolls for bending metal sheets and more in particular it is directed to a device and to a method for guiding and directing the metal sheet through a bending machine, to form frustoconical structures continuously.

PRIOR ART

As known, in order to make frustoconical structures (or simply "conical" structures, as they are conventionally called in the sector), a metal sheet is subjected to a bending operation by bending machines.

In order to make a frustoconical sector, the metal sheet has to be cut into a suitable shape with longitudinal inner and outer edges provided with a suitable curvature.

The curved sides correspond to the two bases of the final truncated cone, and the mutually tilted rectilinear sides are intended to be joined and reciprocally welded longitudinally so as to complete the truncated cone.

The metal sheet is dragged by the rotation of the rollers and, at the end of bending in the bending machine, is closed on itself to adopt the desired frustoconical shape.

In order to enable the metal sheet to be bent correctly into the frustoconical shape, it is necessary for the metal sheet to travel with precision over a preset trajectory, rotating around a set rotation centre.

In order to impose rotation on the advancing metal sheet, a pin or wheel element is currently resorted to, on which the inner concave curved edge of the metal sheet goes to rest.

The metal sheet, which is pulled by the action of the rollers of the bending machine, rests with the inner, curved own edge on the wheel or pin element, which acts as a rotation fulcrum for the metal sheet.

Clearly, the pressure forces that the edge and the pin or wheel element exchange, as they are very localized, are significant, and this can unfortunately cause damage to the edge, in particular when the thicknesses of the metal sheet are rather reduced.

Further, it should be noted that very often this edge is caulked because it has to enable the frustoconical structure that is obtained to be subsequently welded with another frustoconical structure to make, for example, a wind-energy installation.

Obviously, in the case of a caulked edge, the problem is still very felt of a possible risk of damage thereto due to excessive concentrated pressure, as the contact edge (the vertical part of the caulk) is very reduced.

Embodiments of devices of the type disclosed above are known from GB1203924, JPH1076319, U.S. Pat. No. 2,808,096, CN103624166, DE1269084.

Other known systems provide for the use of a guide pad on which the inner curved edge of the metal sheet comes to rest and slides relatively. In this case, on the one hand a more extended contact area is achieved between the pad and the metal sheet edge, nevertheless a relative sliding between the pad and the metal sheet edge is seen that not only makes the process more difficult because of the sliding friction that arises but once again the geometry of the caulked edge is damaged irreparably. Further, the invariable geometric shape of the guide pad does not ensure the achievement of an extended contact zone when metal sheets are processed with different curvature values, this thus reproposing the same problems of stress concentration discussed above for the pin devices.

Other devices are known from U.S. Pat. Nos. 2,857,158 and 3,398,871, which nevertheless have little versatility and are not suitable for interacting with metal sheets having curved longitudinal edges.

There thus remains until today ample room for improvements in guide systems for bending metal sheets to make conical structures.

OBJECTS OF THE INVENTION

One object of the invention is to improve current guide devices for guiding the metal sheet.

Another object is to provide a technical solution that is able to guide and rotate a metal sheet during the continuous advancement for the entire extent thereof and not intermittently as occurs in the conventional systems when it is desired to avoid continuous rolling or sliding of the edge of the metal sheet on the pads or wheels, and which provide "pushers" that, at intervals that are of varying length during the entire extent thereof push the metal sheet, rotating the metal sheet slightly as it enters the bending machine, so as to make the process faster, safer and more efficient, and at the same time such as to preserve the geometry of the caulked edge of the metal sheets without ruining the caulked edge, as occurs on the other hand in known systems.

Another object is to achieve a continuous conical curvature process that is fast, easy and efficient, preserving the shape of the caulk from deformation and which is able to increase the safety levels to which the operators are exposed and to reduce the possibilities of error.

A further object is to improve the geometric precision and the machining tolerances and reduce the number of operators necessary.

SHORT DESCRIPTION OF THE INVENTION

These objects and further advantages of the invention are achievable by a device and a method according to what is defined in claims 1 and 25.

In a first aspect of the invention, a device is provided for guiding and directing a metal sheet in a bending machine to form continuously a conical structure, in particular a frustoconical structure, as defined in claim 1.

In a second aspect of the invention, a method is provided for guiding and directing a metal sheet in a bending machine to form continuously a conical structure, in particular a frustoconical structure, comprising the steps of:

bringing a longitudinal edge of said metal sheet into contact with resting and contrasting arrangement extending along a closed path, contrasting, by said resting and contrasting arrangement, a movement of said edge in a direction that is transverse to a preset advancement trajectory of said metal sheet, conforming said resting and contrasting arrangement with the longitudinal profile of said edge so as to obtain an extended zone of contact with said edge along which a contrasting distributed pressure is imposed on said edge, moving said resting and contrasting arrangement, along said closed path, around a supporting body having at least one oblong lateral portion facing said edge, at a speed corresponding to that of said metal sheet edge, in the absence of relative sliding and rolling, and accompanying said metal sheet edge so as to impose on said metal sheet the movement along said preset advancement trajectory to and through said bending machine.

Owing to the invention, the aforesaid drawbacks are overcome.

In particular, owing to the invention, the metal sheet is rotated whilst it advances without excessive concentrated loads being generated, as in the case of known wheels that act as a pivot, or undesired sliding actions as in the case of pad guides, which would cause irreparable damage to the caulked edge of the metal sheet, compromising the subsequent use of the metal sheet.

Further features and advantages will be clear from the appended claims and from the description.

The invention can be better understood and implemented with reference to the attached drawings that illustrate an embodiment thereof by way of non-limiting example, in which:

FIG. 4 is a fragmentary view of the device according to the invention;

FIG. 5 is an exploded view of the device, in which resting and contrasting arrangement are visible comprising track link elements of the device;

FIG. 6 shows a track link element of the device;

FIG. 7 shows another embodiment of the track link element of the device;

FIG. 8 is a top view of the resting and contrasting arrangement of the device;

FIG. 9 is a section taken along the plane IX-IX in FIG. 8;

FIG. 10 is a section taken along the plane X-X in FIG. 8;

FIG. 11 is a front view of the resting and contrasting arrangement;

FIG. 12 is a section taken along the plane XII-XII in FIG. 11;

FIG. 13 shows the device according to the invention into contact with an edge of a metal sheet;

FIGS. 14 and 15 are different views of one embodiment of a track link element;

FIGS. 16 and 17 are two different views of another embodiment of a track link element;

FIGS. 18 and 19 are two different views of a further embodiment of a track link element;

FIG. 23 shows schematically an embodiment of supporting body for the resting and contrasting arrangement of the device;

FIG. 24 shows schematically adjusting arrangement to vary the geometric conformation of the supporting body of the device;

FIGS. 25 and 26 show schematically, in two different operating configurations, another embodiment of a supporting body for the resting and contrasting arrangement of the device;

FIG. 34 shows an embodiment of device with motor-driven resting and contrasting arrangement;

FIG. 35 is a view like that of FIG. 34 in which a track link element has been removed to make an internal part of the device visible;

FIG. 36 is an exploded view of the device of FIG. 34;

FIG. 38 shows schematically an embodiment of the device according to the invention, provided with a self-aligning system of mechanical type;

FIG. 39 shows the device of FIG. 28 in a different operating configuration, to adapt to a metal sheet with a longitudinal edge having a smaller radius of curvature than in the case of FIG. 38;

FIG. 45 shows schematically a further embodiment of a device according to the invention, provided with a self-aligning system of hydraulic type;

FIG. 46 shows the device of FIG. 45 in a different operating configuration, to adapt to a metal sheet with the longitudinal edge having a radius of curvature that is less than in the case of FIG. 45;

Figure 1:
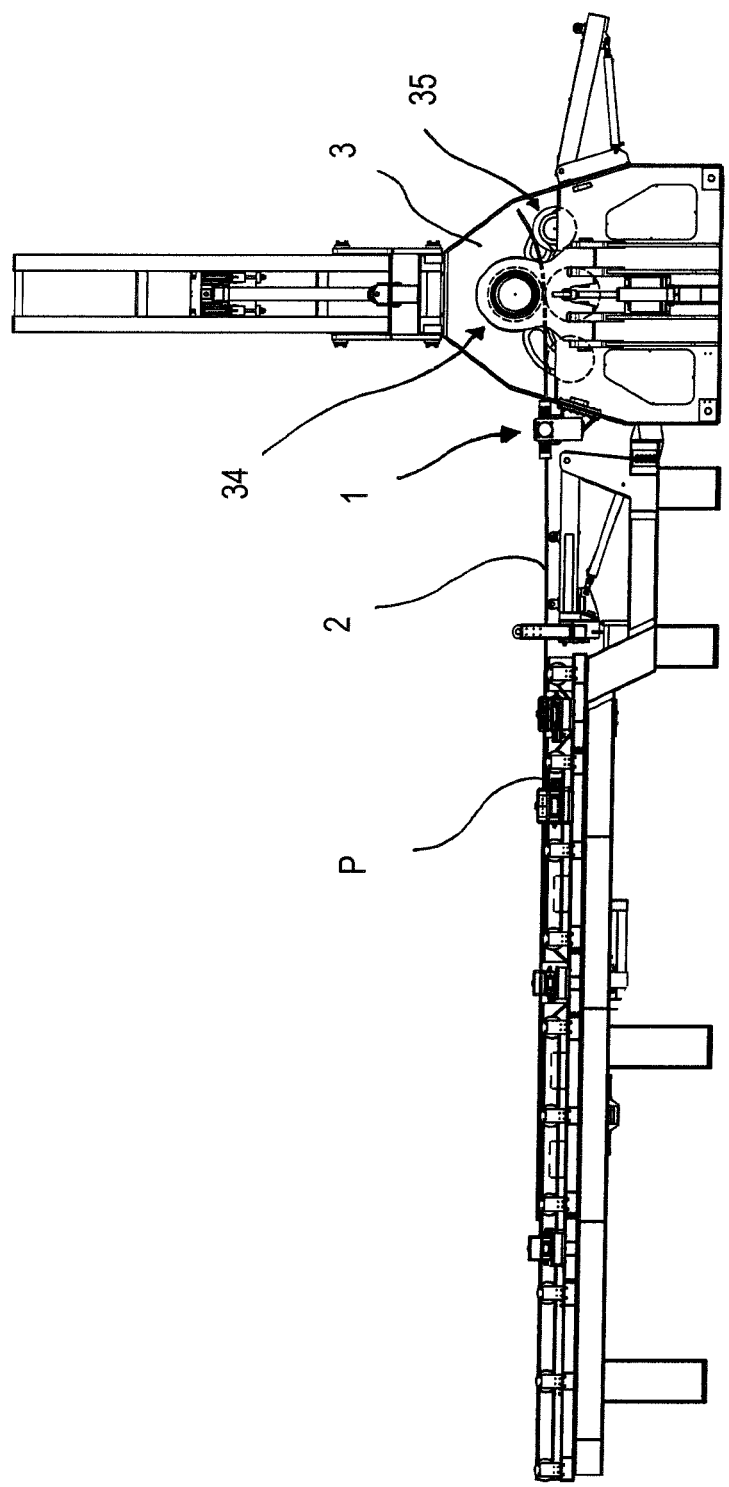
FIG. 1 shows a bending machine on which the device is fitted for guiding and directing a metal sheet according to the present invention.
Figure 3:
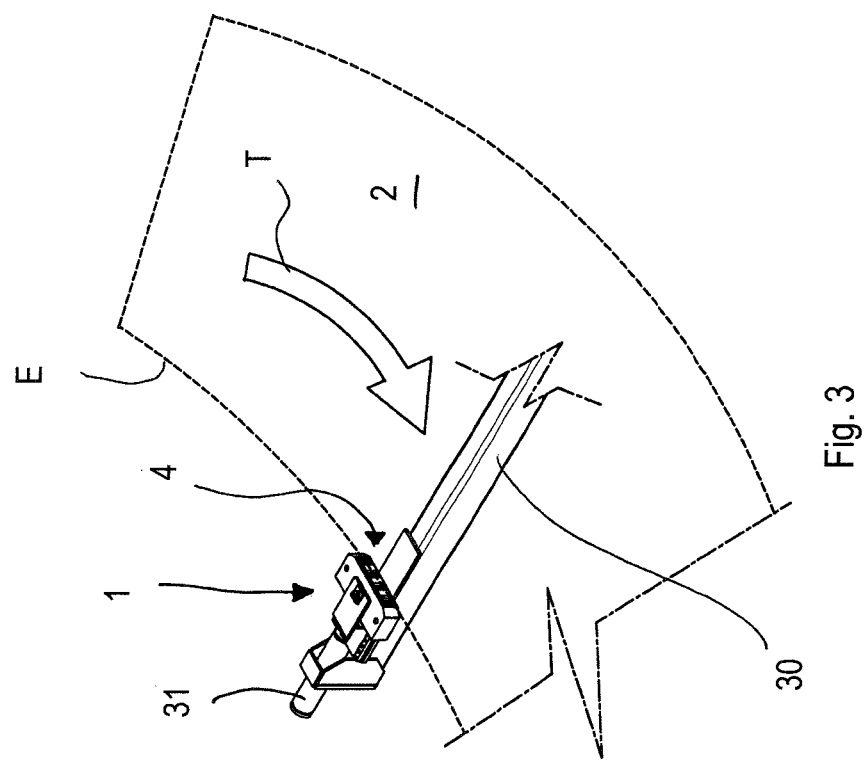
FIGS. 2 and 3 are different perspective views of the device according to the invention, operating on a metal sheet shown in schematic form.
Figure 2:
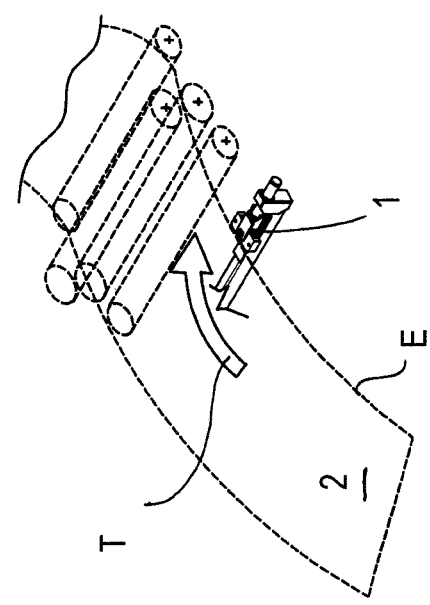

With reference to FIGS. 1, 2 and 3, a device 1 according to the invention is shown that is suitable for being fitted to a bending machine 3 of the type with three or four or more rollers to machine metal products, in particular to bend metal sheets 2. The device 1 guides and directs a metal sheet 2, in particular a metal sheet 2 having curved longitudinal edges, in the bending machine 3 to obtain, by a continuous bending process, a conical structure, for example in particular a frustoconical structure intended to be used in the wind-power sector.

The device 1 can be fitted to a plane P for advancing and resting the metal sheet 2, for example a plane P of the roller conveyor type or to another support placed upstream of the curvature rollers 34, 35 of the bending machine 3.

It is not ruled out that the device 1, or several devices 1, can be fitted in several different positions, upstream and or downstream, of the aforesaid rollers 34 and/or 34, or also in a position aligned on the rollers 34, i.e. on the plane that is coplanar with the axes of these rollers, near a head zone of the rollers 34.

The device 1, shown better in FIGS. 4 to 12, comprises resting and contrasting arrangement (4; 104; 204) extending along a closed path, and suitable for restingly receiving a longitudinal edge E of the metal sheet 2 and contrasting a movement of the edge E transversely to the correct advancement trajectory T along which the metal sheet 2 is supplied to and through the bending machine 3. More precisely, the resting and contrasting arrangement (4; 104; 204) is particularly suitable for coming into contact with a shorter curved longitudinal edge E of the metal sheet 2, i.e. the substantially longitudinal edge with a concave curvature that is more internal than the advancement trajectory T along which the metal sheet 2 moves. The advancement trajectory T, in the case of a continuous conical curvature operation, is a curved trajectory.

Various possible embodiments of the resting and contrasting means (4; 104; 204) will be disclosed below in detail.

The device 1 comprises a supporting body S for the aforesaid resting and contrasting arrangement (4; 104; 204), having at least one oblong lateral portion 5 that is suitable for facing the aforesaid edge E.

The oblong lateral portion 5 is configured for conforming, i.e. imposing an extent that is longitudinal to the resting and contrasting arrangement (4; 104; 204) such as to match as much as possible with the extent, i.e. longitudinal profile of the edge E.

The edge E of the metal sheet 2 to be guided, in the case of a conical curvature process, has a curved extent (i.e. it is a circumference sector), and for this reason the supporting body S that acts as a guide for the resting and contrasting arrangement (4; 104; 204), can have a slightly convex geometry to impose on the resting and contrasting arrangement (4; 104; 204) a geometry that reproduces as far as possible the curved extent of the edge E, and enables it to become coupled as far as possible with the curved profile of the metal sheet 2.

In particular, the side portion 5 has a convex profile so as to force the resting and contrasting arrangement (4; 104; 204) to conform to the concave edge E.

This is achieved by making an extended zone of reciprocal contact between the resting and contrasting arrangement (4; 104; 204) and the edge E, and so as to impose on the latter a contrasting distributed pressure and thus non localized or concentrated pressure as unfortunately occurs in certain apparatuses of prior art with wheel or pad. A more detailed description of the supporting body S will follow below.

The resting and contrasting arrangement (4; 104; 204) extends around the supporting body S along a closed loop path, which can be oblong, triangular or rectangular in shape or be of another suitable shape provided that it has at least one longer side that is intended for a more extensive contact with the edge E of the metal sheet.

In a first embodiment, with reference to FIGS. 5 to 12, the resting and contrasting arrangement (4; 104; 204) comprises a plurality of track link elements 4 that are connected together by an articulated connection.

Each track link element 4 comprises, externally, a contact surface 7 that is suitable for interacting, i.e. coming into contact with the edge E of the metal sheet 2 to be bent. The contact surface 7 extends longitudinally with a flat or slightly convex shape to adapt to the geometry of the curved edge E of the metal sheet 2.

As shown better in FIG. 6, 10 (or also in FIGS. 14 to 19 relating to different possible versions of a track link element 4), each track link element 4 is provided behind, i.e. on the side intended to face the supporting body S, with longitudinal mutually parallel rib portions 24 that together define extended longitudinal recesses 29.

Connecting pins 26 are provided that extend transversely through said rib portions (24) and by which, inside the longitudinal recesses 29, one or more wheels 25, partially protruding outside the recesses, 29 are rotatably fitted, arranged for being able to roll on respective tracks 6 obtained peripherally on the supporting body S, thus enabling a fluid movement of the track link elements 4 along the entire perimeter of the supporting body S.

The track link elements 4 are mutually articulated by chain link elements 23 that are connected by the aforesaid connecting pins 26.

In one possible version, shown in FIG. 7, the track link elements 4 are mutually articulated directly, i.e. devoid of mesh elements 23.

Precisely, each track link element 4 comprises, at a first end, first wing portions 27 alternating with one or more concatenation seats 28, and, at a second end, second wing portions 27' that alternate with one or more respective concatenation seats 28'.

The first wing portions 27 and concatenation seats 28 are geometrically formed to couple, by suitable connecting pins, respectively with the second wing portions 27' and the concatenation seats 28' of another track link element 4 placed in an adjacent position, and so on.

The contact surface 7 of each track link element 4 can have several desired geometrical shapes, in function of the particular geometry of the edge E of the metal sheet 2, in particular if the edge E is caulked and can have different possible transverse caulking profiles that are useful for subsequent welding.

FIGS. 14 and 15 show the embodiment according to which the contact surface 7 has a profile, according to a cross section, which is flat, to establish a "facial" contact with the edge E, which is suitable for metal sheets without a caulked edge that would adhere to the entire height of the edge and for metal sheets with a caulked edge that anyway has a vertical part 7C.

FIGS. 16 and 17 show another embodiment according to which the contact surface 7 comprises two surface zones 7A, 7B that are tilted and mutually convergent towards a longitudinal centre region but are connected together by a further surface strip (7C) having a linear transverse profile.

The track link element 4 thus has a broken transverse profile that combines perfectly with the profile, formed in a complementary manner therewith, of the edge E of a metal sheet 2.

FIGS. 18 and 19 show another embodiment according to which the contact surface 7 comprises two surface zones 7A, 7B that are tilted and reciprocally convergent and incident on a longitudinal centre region so as to define, on the track link element 4, a V-shaped recess that is suitable for receiving, and mating with, a caulked edge E' that terminates in a substantially sharp corner, that is thus geometrically different from the previously disclosed case.

Figure 20:
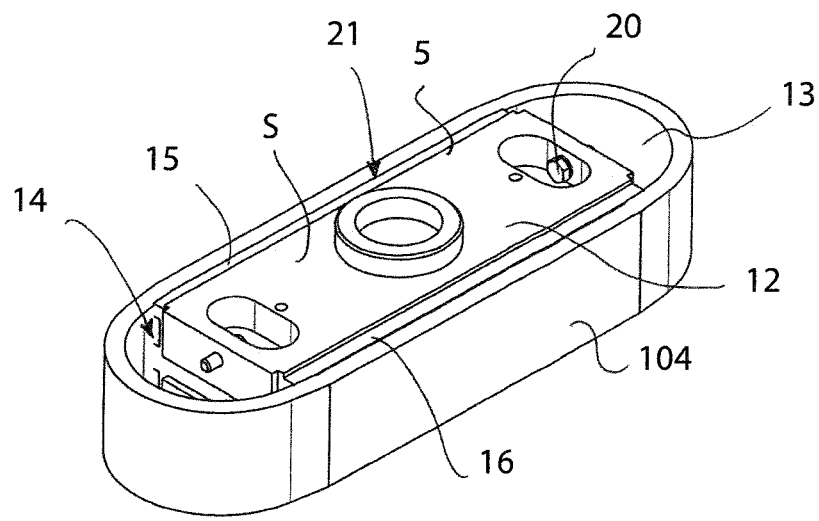
FIG. 20 shows a second embodiment in which the resting and contrasting arrangement is defined by a web element.

According to another embodiment shown in FIG. 20, the resting and contrasting arrangement comprises a web element 104, shaped for winding, and moving, around the aforesaid supporting body (S).

The web element 104 is made of a flexible material, for example metal or anyway a material that has suitable resistance, hardness, or flexibility values, in general the mechanical and physical properties that are suitable for the function for which it is proposed.

The web element 104 performs the same function as the track link elements 4, but provides a contact surface for the metal sheet 2 that is even greater and of continuous type.

Figure 21:
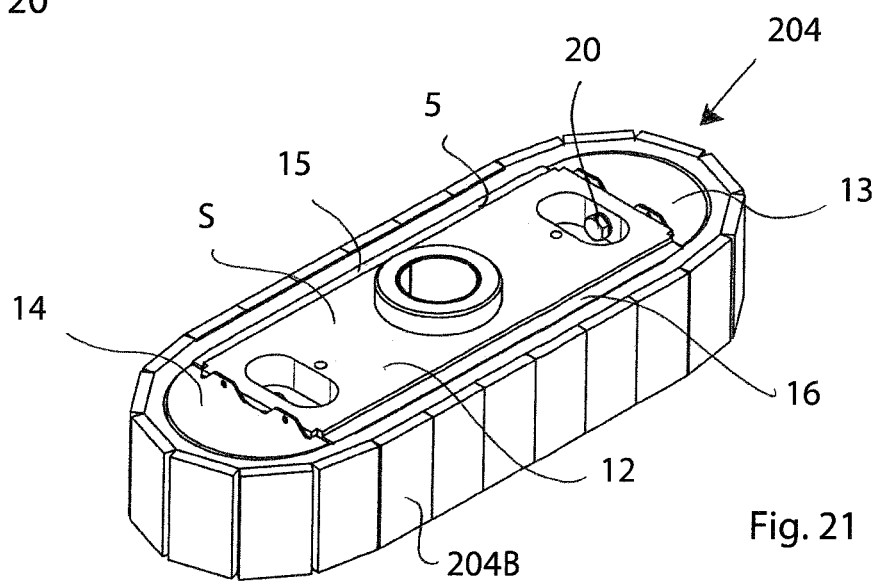
FIGS. 21 and 22 are two different views of a third embodiment in which the resting and contrasting arrangement is defined by a belt element provided with contact plate elements.
Figure 22:
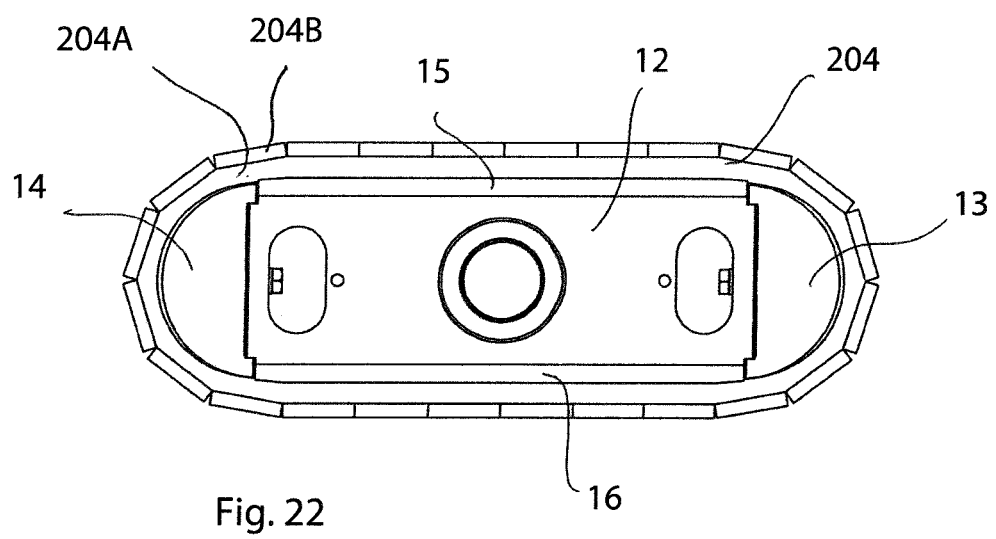

According to a further embodiment shown in FIGS. 21 and 22, the resting and contrasting arrangement comprises a belt element 204, shaped for winding, and moving, around the aforesaid supporting body S, wherein the belt element 204 comprises a substrate 204A in flexible material to which plates 204B are fixed that are suitable for coming into contact with said edge E of metal sheet 2.

The substrate 204A made of flexible material is made of rubber, flexible plastics, metal or another material that is provided with suitable mechanical and physical features. The plates 204B can be made of metal or anyway of another material that is provided with the necessary mechanical and physical features that make the material suitable for supporting high contact pressures and mechanical stress in general.

In all the embodiments that have been disclosed or in others disclosed below, the resting and contrasting arrangement (4; 104; 204) is thus movable around the supporting body S along a closed path so as to accompany the edge E of the metal sheet 2 by reciprocal distributed contact that is devoid of both relative sliding and of relative rolling.

Thus, with respect to the known systems provided with guide and sliding pads, the device 1 according to the invention shows the advantage of avoiding relative sliding, thus sliding friction, with the edge of the advancing metal sheet 2.

On the other hand, with respect to known systems provided with pins or wheels on which the edges of the metal sheet roll in direct contact, generating high concentrated and localized force on the contact and rolling point, the device 1 ensures an extended area of contact with the edge E without rolling, thus rolling friction, being generated, thus succeeding in accompanying fluidly and precisely the metal sheet 2 along the correct advancement trajectory T to and through the bending machine 3, without compromising and damaging in any manner the edge E of the metal sheet 2.

There are now disclosed, with reference to FIG. 23-26, certain possible forms of implementation of the supporting body S, on which the resting and contrasting arrangement (4; 104; 204) is movably fitted that has just been disclosed in the various embodiments.

The device 1 is able to operate with a wide range of metal sheet geometries. By way of non-limiting example, and merely in order to explain better and highlight the operational potential of the device 1, it is emphasised that the latter can couple effectively with curvature radii of the smallest inner edge (the concave edge E) that vary from about 8-10 metres upwards until they reach a rectangular geometry of the metal sheet, which generates a structure that is no longer conical but cylindrical. As this inner radius of curvature grows, the degree of curvature of the trajectory is reduced correspondingly that the metal sheet has to follow to be bent, and thus the metal sheet has ever less need to rotate during movement.

In terms of conicity angles, it has been ascertained that the advantages provided by using the device 1 are particularly appreciated in bending metal sheets the conicity angles of which (defined between the front edge and the rear edge of the metal sheet) can vary between 0.5 degrees to 15-20 degrees.

In order to be able to adapt even more effectively to the different embodiments of "banana-shaped" metal sheets, the supporting body, or supporting head S, can, in a non-limiting manner, have a variable geometry, as explained below.

Precisely, the supporting head S can advantageously consist of several parts (12, 13, 14, 15, 16; 17, 18, 19) that are mutually connected, the reciprocal position of which is variable by suitable adjusting arrangement (20, 21, 22), or by elastic connecting arrangement, so as to be able to modify the geometric shape of the supporting head S to adapt the shape of the closed path of the resting and contrasting arrangement (4; 104; 204), such as the track link elements, or web or belt, to the longitudinal geometric profile of the edge E of the metal sheet 2.

The aforesaid adjusting arrangement can comprise screw elements 20, and/or thickening elements 21, and/or elements 22 of the wedge type and/or of the threaded cones type, or of other similar or equivalent types provided that they are able to space apart from one another in a desired manner the parts (12, 13, 14, 15, 16; 17, 18, 19) that make up the supporting head S.

On the other hand, the elastic connecting arrangement can comprise rubber articulated joints or metal spring elements or other equivalent elements.

In the embodiment that is schematically shown in FIG. 23, the supporting body S consists of a base part 12 and two end parts 13 and 14, the position of which with respect to the base part 12 can be adjusted by acting on suitable adjusting arrangement, such as screws 20, thickening elements 21 or other connecting and adjusting devices.

In the supporting body S further wall parts 15, 16 are further included that can be spaced apart in a desired manner by interposed adjusting arrangement such as elements 22 of the wedge type and/or of the threaded cones type (shown in FIG. 24), or thickening elements 21 or other equivalents.

According to another embodiment shown schematically in FIGS. 25 and 26, the supporting body S, of oblong shape, is divided into several portions, for example a central part 17, and two parts 18, 19 placed at opposite ends.

The parts 17, 18, 19 are connected together by the aforesaid elastic connecting arrangement, which gives the supporting body S an "elastic configuration". Owing to the corresponding variable positioning between the central part 17, and the parts 18, 19, the geometric configuration is modifiable of the closed path along which the resting and contrasting arrangement (4; 104; 204) extends.

When the device 1, or more precisely, the resting and contrasting arrangement (4; 104; 204) reaches the contact position with, and pressing on, the edge E, the elastic connecting arrangement enables the parts 17, 18, 19 to be arranged reciprocally, adapting to the curvature of said edge E.

As seen from the schematization of FIG. 26, the objective is achieved of having track link elements 4 (or similarly the web 104 or belt 204) resting, with an extended contact, on the curved inner edge E, of the metal sheet 2, forcing the metal sheet 2, by the distributed pressing action, to rotate slightly to ensure the correct geometry of the cone, i.e.

maintaining the generators thereof parallel to the axis of the rollers 34 of the bending machine 3. This embodiment of a supporting body S with an "elastic geometry" thus permits "automatic" adaptation of the curvature of the portion thereof intended to interact directly with the edge E of the metal sheet 2.

Owing to the aforesaid configurations of the device 1, it is possible to process metal sheets with numerous different curvature angles and dimensions. As has been pointed out, the variable convexity of the supporting body S enables the track link elements 4 or a web 104, or a belt 204, to be coupled perfectly with a curved circumference portion of the edge E with which they come into contact.

In FIGS. 38 to 44 another embodiment of device 1 is shown with a supporting body S with variable geometry, in particular self-aligning geometry.

According to this embodiment, the supporting body S is defined by two self-aligning parts 62, 64 of oscillating type, i.e. configured for rotating, under the action of the pressure that they receive from the edge E of the metal sheet 2, around a respective rotation axis W, with respect to the body 63 portion.

Each self-aligning part comprises a rocker element 62, 64 hinged on a respective oscillation axis W placed nearer a central part of the supporting body S.

Elastic contrasting elements 65 is provided that lies on a zone of the respective rocker element 62, 64 placed further away from the central zone of the supporting body S. The elastic contrasting elements 65 acts to move the rocker elements 62, 64 to the edge E of the metal sheet.

The elastic contrasting elements 65 in particular comprises compression springs, or other equivalent elastic arrangement.

During operation, in interaction with the metal sheet 2, the rocker elements 62, 64, through the effect of the pressure that they receive from the edge E of the metal sheet 2, oscillate so as to adapt the longitudinal profile of the path—along which the resting and contrasting arrangement (4; 104; 204) advances—to the curvature of the edge E of metal sheet 2.

A greater curvature (lesser curvature radius) of the edge E will be matched by a greater rotation of the rocker elements 62, 64 and vice versa.

In FIGS. 45 to 51 a further embodiment is shown of a device with supporting body S with variable geometry, this time with an adaptation system of hydraulic type.

In this case, the supporting body S comprises parts 71 that are movable transversely to the longitudinal extent of the supporting body S, and the adjusting arrangement comprises hydraulic contrasting elements 72 arranged for acting on the aforesaid parts 71 to adapt the position and path of the resting and contrasting arrangement (4; 104; 204) to the curvature of the longitudinal edge E.

Owing to the embodiments disclosed above, the device 1 that is thus configured turns out to be even more effective in the action of guiding the metal sheets 2, adapting perfectly to the degree of curvature of the longitudinal edges. In particular, the occurrence of undesired localized pressure forces is effectively prevented, ensuring on the other hand more even and extensive distribution along the mutual contact surface between the device 1 and the edge E of the metal sheet 2.

In all the embodiments disclosed up until now, the resting and contrasting arrangement (4; 104; 204) is supported in a freely rotatable manner by the supporting body S, i.e. the movement of the resting and contrasting arrangement (4; 104; 204) is determined by the contact with the edge E of the advancing metal sheet 2. In other words, the extended contact and the pressure exchanged in a distributed and uniform manner between the resting and contrasting arrangement (4; 104; 204) and the edge E means that the resting and contrasting arrangement (4; 104; 204) is dragged by the metal sheet 2 itself, without however phenomena of relative sliding being generated therebetween.

The metal sheet clamped between the rollers 34 is dragged forwards by rotation thereof.

The pressure of the edge E of the metal sheet 2 against the freely rotating track link elements 4 drags the latter in movement along the respective tracks 6 of the support head S.

The track link elements 4 thus perform effectively the function of "accompanying" and "contrasting" (transversely to the trajectory) the edge E of the metal sheet 2 to rotate the metal sheet 2 slightly, ensuring the correct conical geometry to be obtained.

If it should be useful to facilitate the movement of the resting and contrasting arrangement (4; 104; 204), to ensure fluidity of movement and the correct "accompanying" function result, a driven embodiment of the device 1 is also provided.

The resting and contrasting arrangement (4; 104; 204) is driven to move actively at a speed correlated with the speed of the edge (E) with which they are in contact, by an electromechanical transmission or a transmission of hydraulic type.

In FIGS. 34 to 37, a driven embodiment of the device 1 is shown, in which the resting and contrasting arrangement (4; 104; 204) is driven by motor device 40 fitted to the supporting body S. For the sake of simplicity, the driven embodiment is shown only with reference to the form of implementation with track link elements 4, without naturally excluding that the driven embodiment is identically applicable to cases in which the web element 104 or the belt element 204 are provided.

As shown in FIG. 36, two toothed wheels 47 are provided on which the track link elements 4 are wound. The teeth of the toothed wheels 47 take a direct hold of the connecting pins 26 to which, in this case, the wheels 25 of the embodiments previously disclosed are not connected.

The motor device 40 is of the variable rotational speed type, in order to be able to adapt to the advancement speed of the edge E of the metal sheet 2 to be accompanied.

Sensor elements 42 are provided that detects the current speed of the motor device 40, and thus the resting and contrasting arrangement (4; 104; 204).

In particular, the motor device 40 is of the type comprising electric inverter member 41 or of the hydraulic drive type, comprising a variable hydraulic flowrate drive device.

Figure 37:
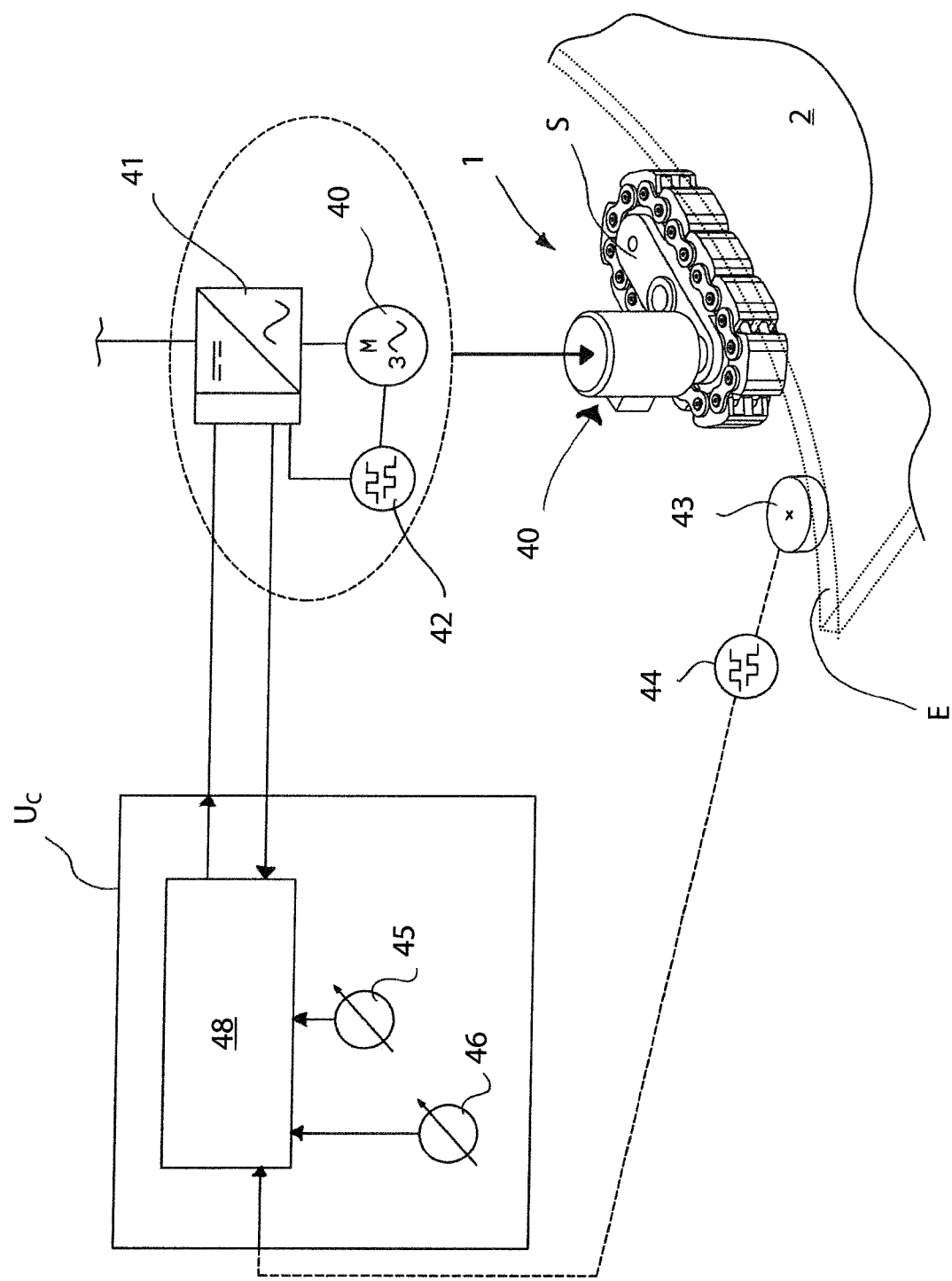
FIG. 37 shows the motor-driven device of FIG. 34 operationally connected to a control system.
Figure 40:
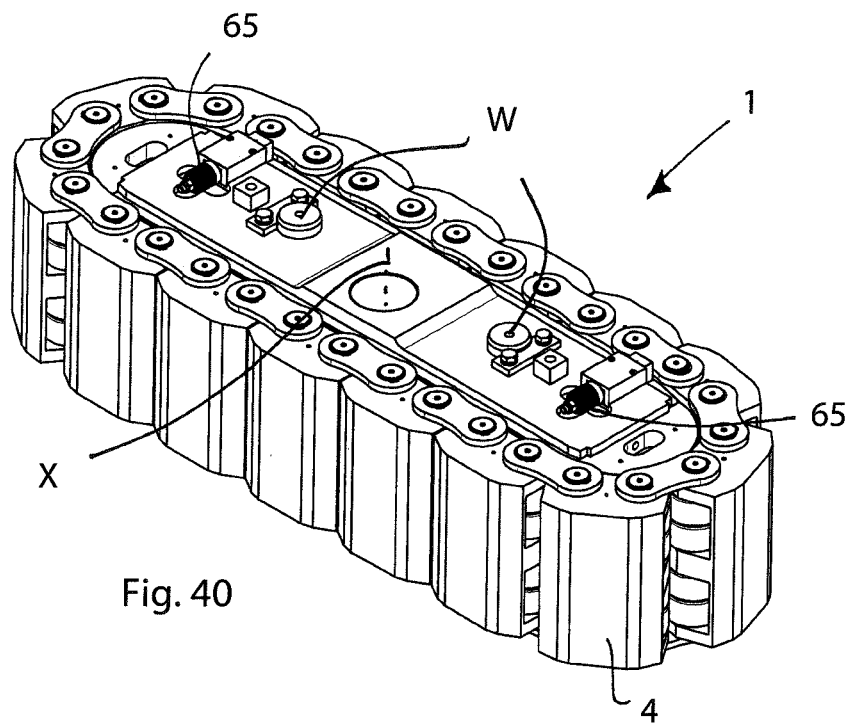
FIGS. 40 and 41 are two different perspective views of the device in the embodiment corresponding to the schematic representation of FIGS. 38 and 39.
Figure 41:
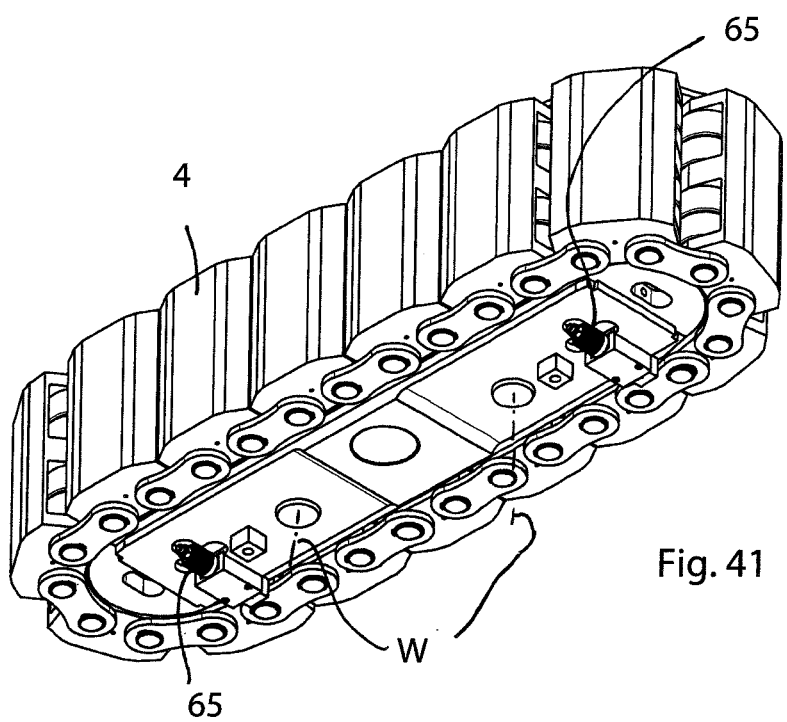
Figure 42:
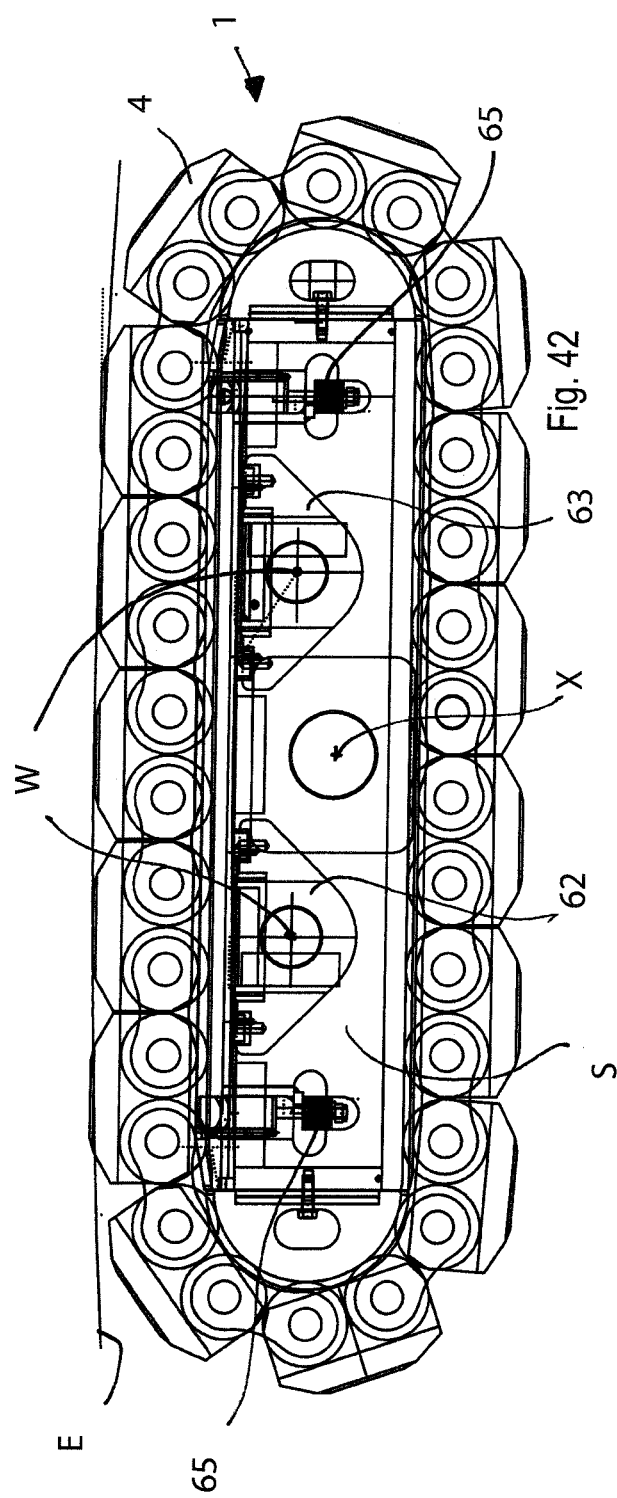
FIG. 42 is a top view of the device of FIG. 40.
Figure 43:
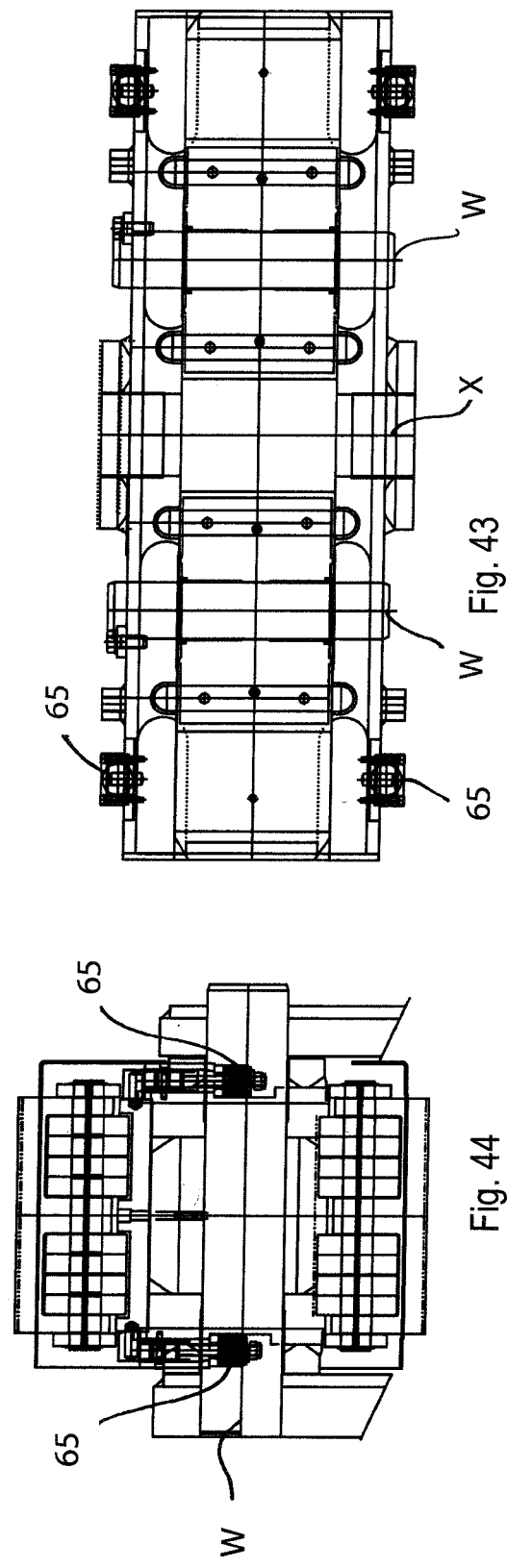
FIG. 43 is a top view of part of the device of FIG. 42.
Figure 44:
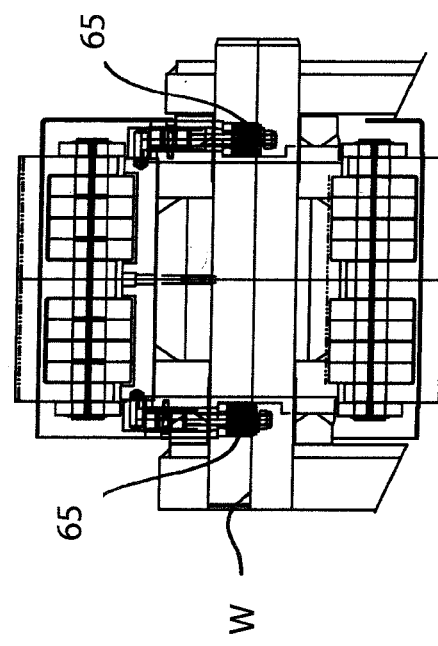
FIG. 44 is a partial and section view of the device of FIG. 42.
Figure 47:
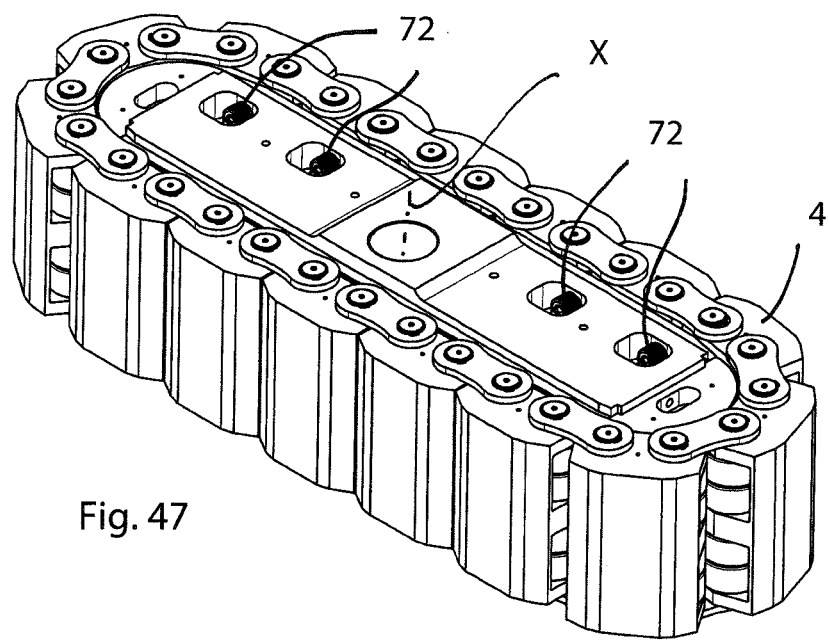
FIGS. 47 and 48 are two different perspective views of the device in the embodiment corresponding to the schematic representation of FIGS. 45 and 46.
Figure 48:
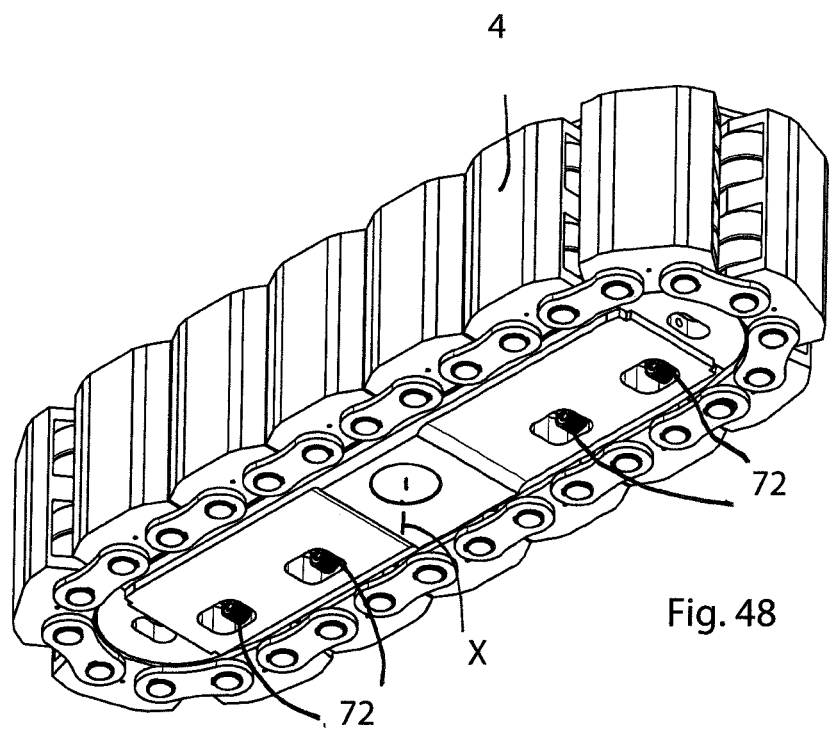
Figure 49:
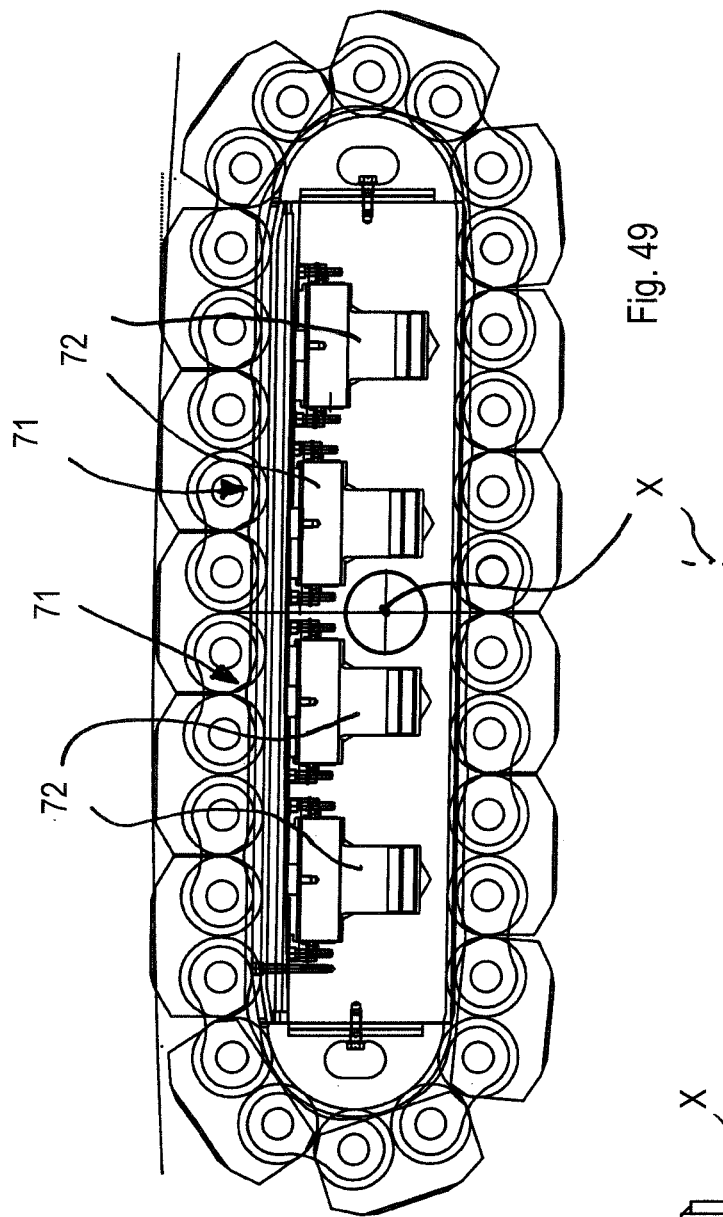
FIG. 49 is a top view of the device in FIG. 47.
Figure 50:
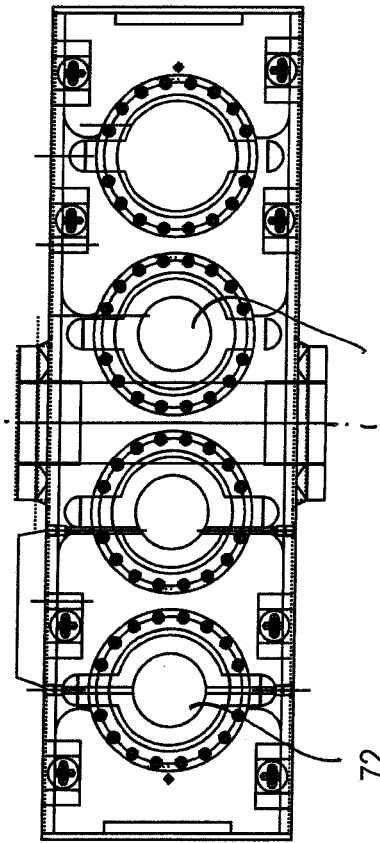
FIG. 50 is a side view of part of the device of FIG. 47.
Figure 51:
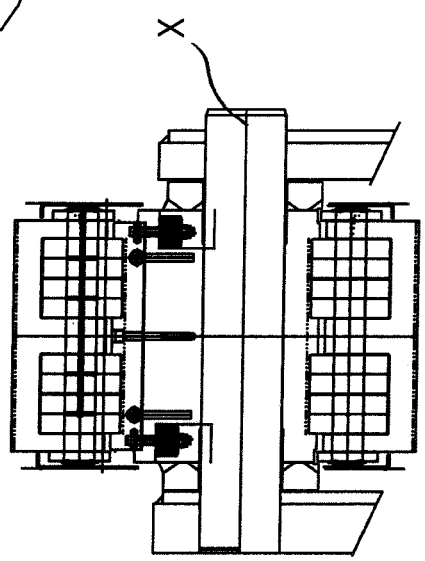
FIG. 51 is a partial and section view of the device of FIG. 47.

With reference to the diagram of FIG. 37, the device 1 includes further sensor elements (43, 44), configured for detecting the instantaneous speed of the edge E near the resting and contrasting arrangement (4; 104; 204).

This sensor elements can comprise a measuring wheel 43, or other device with the same function, intended to make contact with the edge E to be rotated by the latter and be operationally coupled with an electronic detector 44, for example of the encoder type.

A control unit $U_C$ is provided that is configured for receiving and comparing incoming signals generated by the sensor elements 42 and by the further sensor elements 43, 44 and consequently commanding the drive speed of the motor device 40 to synchronize the current speed of the resting and contrasting arrangement (4; 104; 204) with the current speed of the edge E of the metal sheet 2.

The control unit $U_C$ comprises a programmable logic controller (PLC) 48 having a microprocessor that is suitably programmed for executing, on the basis of the signals of the sensor elements 42 and 43, an automatic correction of the speed of the motor device 40 to synchronize the track link elements 4 (or web element 104, or belt element 204) with the current speed of the edge E, preventing relative sliding phenomena. Suitable components 45 and 46 enable the kinematics of the metric measuring wheel 45 and of the track link elements 4 (or web element 104, or belt element 204) to be correctly calibrated or adjusted.

The device 1 comprises a guiding crossbar 30, shown better in FIGS. 2 to 5, on which the support body S is supported for the resting and contrasting arrangement (4; 104; 204).

The guiding crossbar 30 is suitable for being fitted to the advancement and resting plane P of the bending machine 3. The supporting body S is connected to actuating elements 31 owing to which it is movable along guiding crossbar 30, in a direction that is transverse to the advancement trajectory T of the metal sheet 2.

The supporting body or head S has a hole 11 for connecting—by a pin 10—to a slide 32 that is movable on the guiding crossbar 30. The connection between the pin 10 and the hole 11 confers on the supporting body S a certain degree of rotational freedom around an axis of vertical oscillation X, so as to be able to adapt to the lie of the edge E of the metal sheet 2.

Figure 29:
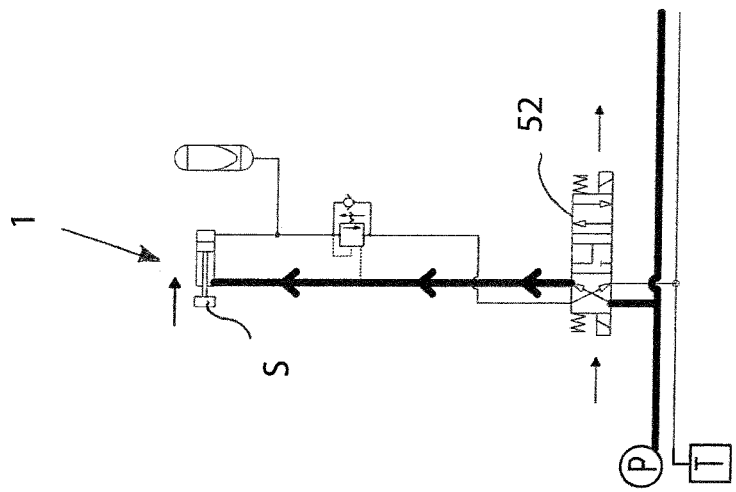
FIGS. 27, 28, 29 show schematically a device drive and control circuit, respectively in three different operating steps.
Figure 28:
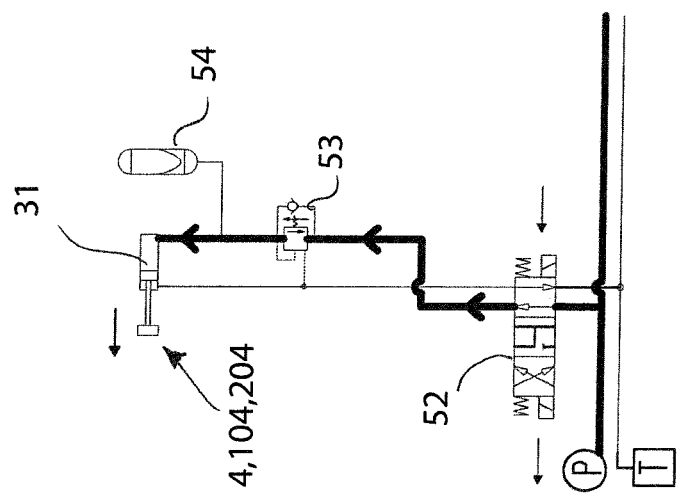
Figure 27:
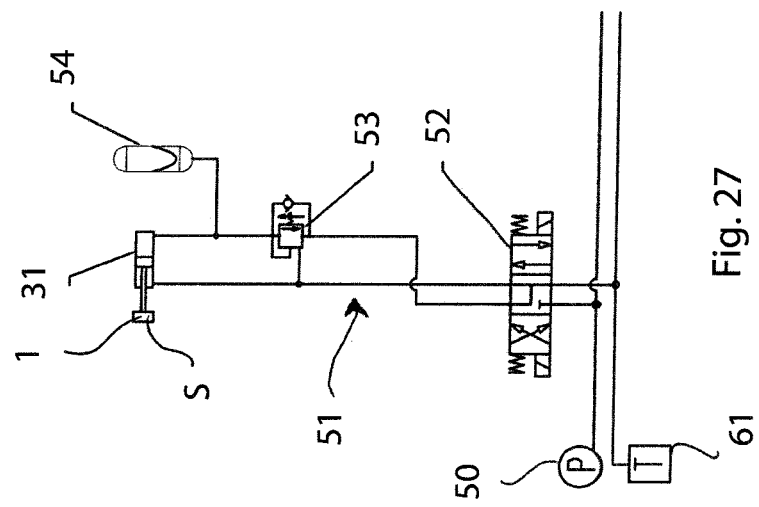

With reference to FIGS. 27 to 29, the actuating elements 31 comprises a dual-effect hydraulic cylinder 31, supplied by a pump 50 from a circuit 51 along which a four-way distributor 52 is provided (e.g. of the solenoid valve or slide valve type), having three possible different operating positions, and a valve 53 for example of overcentre or equivalent type.

An accumulator device 54, such as a container that is arranged for receiving incoming oil coming from the hydraulic cylinder 31, can be connected to the rear chamber of the hydraulic cylinder 31, i.e. the chamber that is filled to project the piston externally and send the support head S to abut against the edge E of the metal sheet.

The accumulator device 54 is arranged to act as a plenum to absorb and dampen possible overloads imposed on said resting and contrasting arrangement (4; 104; 204) that are caused by irregularities (60) on the edge F of the metal sheet 2.

The overcentre valve (53) and the four-way distributor 52 are configured for cooperating, in a "safety" operating mode, to enable oil to be transferred from the rear chamber of the hydraulic cylinder 31 to a tank 61 of the circuit, if the resting and contrasting arrangement (4; 104; 204) intercepts an undesired anomalous protrusion 70 of the edge E, that is potentially harmful for the structural integrity of the device 1 or of other structural parts.

The operation is disclosed of the device 1 with the circuit that has just been disclosed. In the stationary position of the device 1, corresponding to FIG. 27, the oil, supplied by the pump 50, does not enter the solenoid valve 52 which is arranged in the closed position.

By driving the distributor 52 to take the distributor 52 to the open position, as shown in FIG. 28, the oil is delivered by the pump 50 to the rear chamber of the hydraulic cylinder 31, moving in this manner the slide 32, thus the support head S, to the edge E of the metal sheet, to send the track link elements 4 thereof into contact therewith.

When the desired position is reached, and releasing the "advancement" control, the solenoid valve 52 returns to the "rest" position and the oil is maintained in the hydraulic cylinder 31 by closure of the valve 53 that acts to stop and control pressure.

With reference to FIG. 29, after terminating the function of accompanying the edge E, the support head S is taken back by activating the solenoid valve 52 to the other operating position in which, via the suitable circuit branch, the front chamber of the hydraulic cylinder 31 will be supplied.

Figure 30:
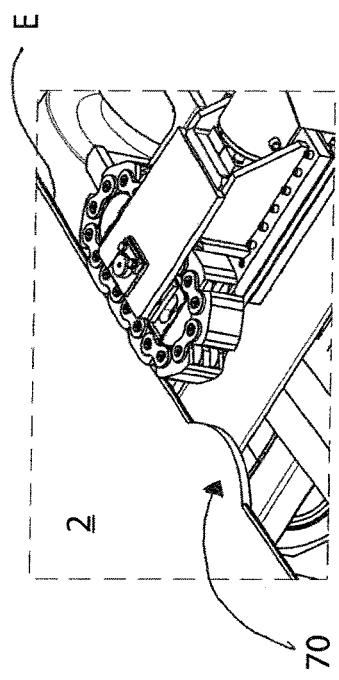
FIG. 30 shows the device in contact with a metal sheet edge having an irregularity.
Figure 31:
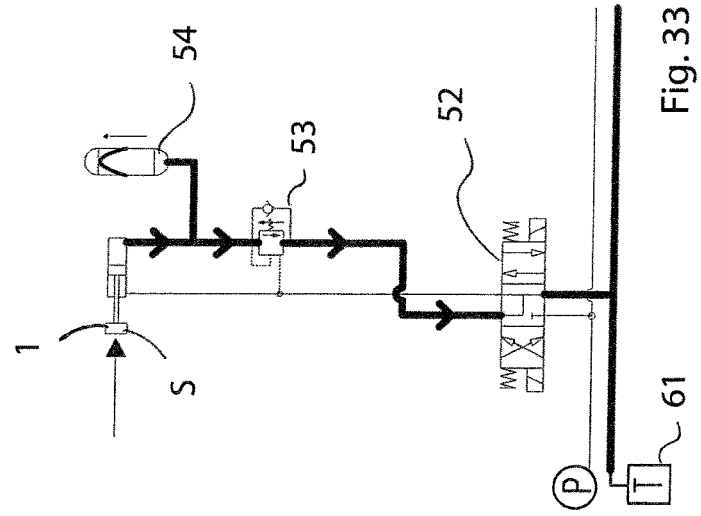
FIG. 31 shows the operation of the device drive and control circuit in the presence of an irregularity on the metal sheet edge as shown by way of example in FIG. 30.

With reference to FIGS. 30 and 31, an operating mode of the just described circuit will be described if small irregularities 60 should occur along the edge E of the metal sheet 2, this operating mode being useful for protecting the device 1 from possible overloads.

During the step in which the support head S is in the work position with the track link elements 4 in contact with the inner edge E, owing to a small "deformity", for example an irregularity or imperfection 60 of the edge E, an excessive load may be generated on the head S. In this situation, the head S can retract slightly owing to the action of the accumulator device 54 that acts as a plenum that absorbs the overload, receiving a small quantity of oil coming from the rear chamber of the hydraulic cylinder 31, damping in this manner the stress. The portions highlighted with a thicker line in FIG. 31 show the circuit part that is affected by this flow of oil directed to the accumulator device 54.

Once the obstacle has been overcome, the dose of oil temporarily received in the accumulator device 54 is returned to the rear chamber of the hydraulic cylinder 31, returning the head S to the correct work position in contact with the edge E.

Figure 32:
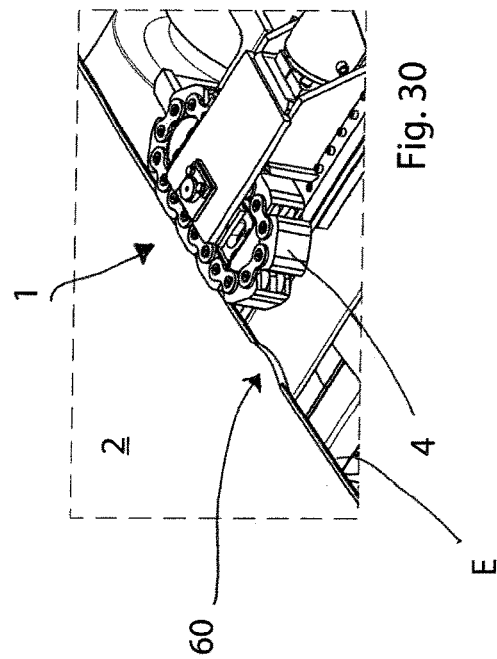
FIG. 32 shows the device in contact with a metal sheet edge having an undesired anomalous protrusion, which is hazardous for the integrity of the device.
Figure 33:
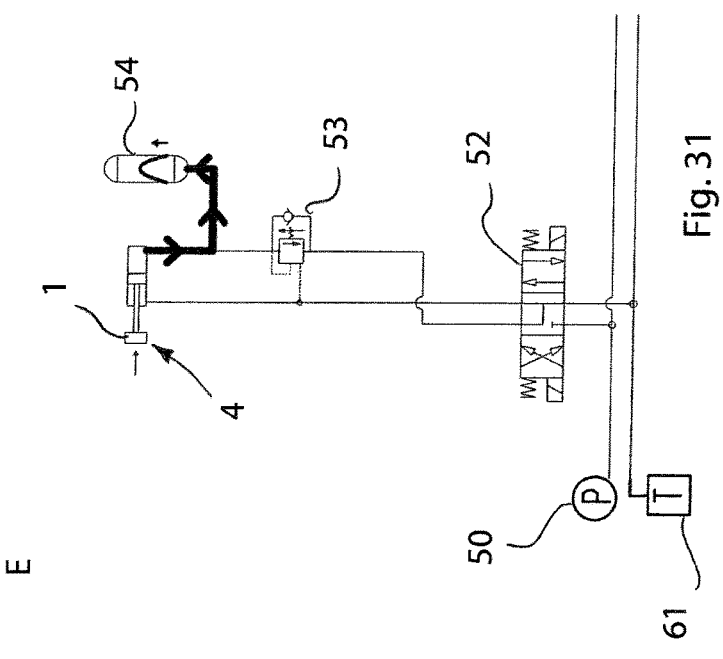
FIG. 33 shows the operation of the device drive and control circuit in the presence of the anomalous protrusion on the metal sheet edge as shown by way of example in FIG. 32.

With reference to FIGS. 32 and 33, if the imperfections or irregularities on the edge E are more accentuated, and thus even more hazardous for the device 1, a "safety operating mode" of the circuit is activated, which protects the system from risks of structural damage.

An anomalous shape of the curved edge E, for example a significant protrusion 70, could be excessive with respect to the "absorption" capacity of the accumulator device 54, not being able in this manner to dampen sufficiently the load generated on the head S. In this case, according to one safety mode, the valve 53 intervenes that enables the transfer of oil from the rear chamber of the cylinder 31 to the tank 61, throttling the passage thereof in a controlled manner. In this manner, the head S with the track link elements 4 is enabled to be pushed backwards by the pressure exerted by the protrusion 70 of the metal sheet, preventing undesired damage due to an overload.

From what has been said and shown in the attached drawings it is clear that a method and a device 1 have been provided owing to which it is possible to:

ensure an easy and efficient continuous conical curvature process, increase the safety levels to which operators are subject, reduce the possibility of machining error and imprecision, improve geometric precision and tolerances and prevent damage to the edge owing to the action of simple resting and accompanying of the track link elements 4 or web 104 or belt 204 that act to compress, without sliding or rolling, reduce the number of operators to one, with clear financial advantages.

It is further understood that what has been said and shown in the attached drawings has been given merely by way of example of the method and of the general features, and of some embodiments of the device according to the present invention. Accordingly, other modifications or variations can be made to the entire device 1, or to parts thereof, and to the respective operating method, without thereby falling outside the scope of the claims.

The invention claimed is:

1. Device for guiding and directing a metal sheet in a bending machine to form continuously a frustoconical structure, said device comprising:
   resting and contrasting arrangement extending along a closed path, and suitable for restingly receiving a longitudinal edge of said metal sheet and contrasting a movement of said edge in a direction that is transverse to a preset advancement trajectory of said metal sheet,
   a supporting body for said resting and contrasting arrangement, having at least one oblong lateral portion that is suitable for facing said edge and configured for conforming said resting and contrasting arrangement to the longitudinal profile of said edge so as to obtain an extended zone of contact with said edge and impress contrasting pressure distributed along said edge,
   said supporting body consisting of several reciprocally connected parts, the reciprocal position of said parts being variable by adjusting arrangement so as to modify the geometrical shape of said supporting body to adapt the shape of the closed path of said resting and contrasting arrangement to the longitudinal geometric profile of said edge of the metal sheet,
   said resting and contrasting arrangement being movable around said supporting body along said closed path to accompany said edge of the metal sheet by a distributed contact devoid of relative sliding and rolling, so as to impose on said metal sheet the movement along said preset advancement trajectory to and through said bending machine.

2. Device according to claim 1, wherein said supporting body is defined by a supporting head around which guide tracks are laterally obtained for said resting and contrasting arrangement.

3. Device according to claim 1, wherein said oblong lateral portion of said supporting body has a convex longitudinal profile for giving said resting and contrasting arrangement a curvature so as to match the concave longitudinal profile of said edge of metal sheet.

4. Device according to claim 1, wherein said adjusting arrangement to vary the reciprocal position of said parts, said adjusting arrangement comprises screw elements, and/or thickening elements, and/or elements of the wedge type and/or of the threaded cones type, said adjusting arrangement being configured for spacing apart from one another in a desired manner said parts of the supporting body.

5. Device according to claim 1, wherein said parts are connected to one another by elastic connecting arrangement, said elastic connecting arrangement enabling said parts, in the contact position with, and pressing on, said edge, to be arranged reciprocally, adapting to the curvature of said edge said.

6. Device according to claim 1, wherein said supporting body is defined by two self-aligning parts configured for rotating around respective rotation axes through the effect of the pressure exerted by said metal sheet, so as to adapt the longitudinal profile of said supporting body, and thus the path of said resting and contrasting arrangement, to the curvature of the longitudinal profile of said edge of metal sheet.

7. Device according to claim 6, wherein each of said two self-aligning parts comprises a rocker element hinged on a respective oscillation axis placed nearer a central part of said supporting body, and said adjusting arrangement comprises elastic contrasting elements lying on each rocker element on a zone of the latter nearer a respective end of said supporting body.

8. Device according to claim 1, in which said supporting body comprises parts that are movable transversely to the longitudinal extent of said supporting body, said adjusting arrangement comprising hydraulic contrasting elements arranged for acting on said parts to adapt the position and path of said resting and contrasting arrangement to the curvature of said longitudinal edge.

9. Device according to claim 1, wherein said resting and contrasting arrangement comprises a plurality of track link elements that are connected together by an articulated connection.

10. Device according to claim 9 wherein each track link element comprises a contact surface suitable for interacting with said edge, wherein said contact surface extends longitudinally with a flat or slightly convex shape to adapt to the curved edge of the metal sheet.

11. Device according to claim 10, wherein each contact surface has a profile, according to a cross section, shaped to adapt to a calking profile of said edge of the metal sheet.

12. Device according to claim 10, wherein each contact surface comprises two surface zones that are tilted and reciprocally converging on a longitudinal centre line region so as to define, on the respective track link element, a V-shaped recess that is suitable for receiving, and matching, the caulked edge of said metal sheet.

13. Device according to claim 12, wherein said two surface zones are connected by a further surface strip having a linear transverse profile.

14. Device according to claim 9, wherein each track link element comprises mutually parallel longitudinal rib portions to define together longitudinal recesses, connecting pins being further provided that extend transversely through said rib portions.

15. Device according to claim 14, wherein said longitudinal recesses house wheels shaped for rolling on respective tracks obtained on said supporting body, said wheels being rotatably fitted to said connecting pins.

16. Device according to claim 14, wherein said track link elements are mutually articulated by chain link elements connected by said connecting pins.

17. Device according to claim 9, wherein each track link element comprises, at a first end, first wing portions and one or more concatenation seats, and, at a second end, second wing portions and one or more respective concatenation seats, said first wing portions and concatenation seats being conformed to couple respectively with the second wing portions and the concatenation seats of an adjacent track link element.

18. Device according to claim 1, wherein said resting and contrasting arrangement comprises a web element, made of flexible metal material or another material of suitable resistance, conformed for winding, and moving around, said supporting body.

19. Device according to claim 1, wherein said resting and contrasting arrangement comprises a belt element, conformed for winding, and moving around, said supporting body, said belt element comprising a substrate made of flexible material to which plates are fixed that are suitable for coming into contact with said edge of metal sheet.

20. Device according to claim 1, wherein said resting and contrasting arrangement is driven to move actively at a speed correlated to the speed of the edge with which the resting and contrasting arrangement is in contact.

21. Device according to claim 1, wherein said resting and contrasting arrangement is driven by motor device fitted to said supporting body, said motor device being coupled with sensor elements to detect the current speed of said motor device, and thus of said resting and contrasting arrangement.

22. Device according to claim 21, wherein said motor device is of the type comprising electric inverter member or of the hydraulic drive type, comprising a variable hydraulic flowrate drive device.

23. Device according to claim 21, comprising further sensor elements configured for detecting the instantaneous speed of said edge near said resting and contrasting arrangement, a control unit being further provided that is configured for receiving and comparing the incoming signals generated by said sensor elements and by said further sensor elements and consequently commanding the drive speed of said motor device to synchronise the current speed of said resting and contrasting arrangement with the current speed of said edge of metal sheet.

24. Device according to claim 1, wherein said supporting body is fitted to a guiding crossbar that is suitable for being fitted to a plane for advancing and resting said metal sheet, and wherein said supporting body is connected to actuating elements by which said supporting body is movable along said guiding crossbar.

25. Device according to claim 24, wherein said supporting body is connected by pin elements to said guiding crossbar, said supporting body having a certain degree of rotational freedom around an axis of oscillation in order to be able to adapt to a curvature of said edge of said metal sheet.

26. Device according to claim 24, wherein said actuating elements comprises a dual-effect hydraulic cylinder, supplied by a pump by a circuit along which a four-ways distributor is provided, having three possible different operating positions, and an overcentre valve, to the rear chamber of said hydraulic cylinder an accumulator device being connected that is arranged for receiving incoming oil coming from said hydraulic cylinder acting as a plenum chamber so as to absorb and dampen possible overloads imposed on said resting and contrasting arrangement and caused by irregularities of the edge of metal sheet, said overcentre valve and said four-ways distributor being configured for cooperating, according to a safety mode, to enable oil to be transferred from the rear chamber of said hydraulic cylinder to a tank if said resting and contrasting arrangement intercepts an undesired anomalous protrusion of said edge that is potentially harmful for the structural integrity of the device.

27. Method for guiding and directing a metal sheet in a bending machine to form continuously a frustoconical structure, comprising the steps of:
bringing a longitudinal edge of said metal sheet into contact with resting and contrasting arrangement extending along a closed path,
contrasting, by said resting and contrasting arrangement, a movement of said edge in a direction that is transverse to a preset advancement trajectory of said metal sheet,
conforming said resting and contrasting arrangement to the longitudinal profile of said edge so as to obtain an extended zone of contact with said edge along which a contrasting distributed pressure is imposed onto said edge,
moving said resting and contrasting arrangement, along said closed path, around a supporting body having at least one oblong lateral portion facing said edge, at a speed corresponding to that of said edge of metal sheet, in the absence of relative sliding and rolling, and
accompanying said edge of metal sheet so as to impose on said metal sheet the movement along said preset advancement trajectory to and through said bending machine.

\* \* \* \* \*